(12) United States Patent
Sullivan et al.

(10) Patent No.: US 6,824,476 B2
(45) Date of Patent: Nov. 30, 2004

(54) MULTI-LAYER GOLF BALL

(75) Inventors: Michael J. Sullivan, Barrington, RI (US); Thomas J. Kennedy, III, Wilbraham, MA (US); Michael John Tzivanis, Chicopee, MA (US); Mark L. Binette, Ludlow, MA (US); Viktor Keller, Enfield, CT (US); William M. Risen, Jr., Rumford, RI (US)

(73) Assignee: Callaway Golf Company, Carlsbad, CA (US)

( * ) Notice: Subject to any disclaimer, the term of this patent is extended or adjusted under 35 U.S.C. 154(b) by 394 days.

(21) Appl. No.: 09/842,607

(22) Filed: Apr. 25, 2001

(65) Prior Publication Data

US 2002/0025862 A1 Feb. 28, 2002

Related U.S. Application Data

(63) Continuation-in-part of application No. 09/776,278, filed on Feb. 2, 2001, which is a continuation of application No. 09/470,196, filed on Dec. 21, 1999, now Pat. No. 6,210,293, which is a continuation of application No. 08/870,585, filed on Jun. 6, 1997, now abandoned, which is a continuation of application No. 08/556,237, filed on Nov. 9, 1995, now abandoned, which is a continuation-in-part of application No. 08/542,793, filed on Oct. 13, 1995, now abandoned, which is a continuation-in-part of application No. 08/070,510, filed on Jun. 1, 1993, now abandoned.

(51) Int. Cl.[7] ............................................. A63B 37/06
(52) U.S. Cl. ..................................................... 473/374
(58) Field of Search .............................. 473/377, 376, 473/378, 373, 374, 371, 367, 368

(56) References Cited

U.S. PATENT DOCUMENTS

| | | |
|---|---|---|
| 2,741,480 A | 4/1956 | Smith |
| 2,973,800 A | 3/1961 | Muccino |
| 3,053,539 A | 9/1962 | Piechowski |
| 3,264,272 A | 8/1966 | Rees |
| 3,313,545 A | 4/1967 | Bartsch |
| 3,373,123 A | 3/1968 | Brice |
| 3,384,612 A | 5/1968 | Brandt et al. |
| 3,395,109 A | 7/1968 | Molitor et al. |
| 3,458,205 A | 7/1969 | Smith et al. |

(List continued on next page.)

FOREIGN PATENT DOCUMENTS

| | | |
|---|---|---|
| CA | 2137841 | 6/1995 |
| EP | 0589647 | 3/1994 |
| EP | 0630665 | 12/1994 |
| EP | 0637459 | 2/1995 |
| GB | 494031 | 10/1938 |
| GB | 2245580 | 1/1992 |
| GB | 2248067 | 3/1992 |
| GB | 2264302 | 11/1992 |
| GB | 2291811 | 2/1996 |
| GB | 2291812 | 2/1996 |

OTHER PUBLICATIONS

Bayer Corporation, "Engineering Polymers Properties Guide Thermoplastics and Polyurethanes," brochure, pp. 2–7, 28–29.

(List continued on next page.)

*Primary Examiner*—Raeann Gordon

(57) ABSTRACT

A unique set of preferred embodiment golf balls is disclosed as follows. In one aspect, a multi-layer golf ball utilizes a particular blend of ionomers in either or both of the cover layers. Preferably, the blend includes a minor percentage of high acid ionomers with a major percentage of low acid ionomers. In another embodiment, golf balls having relatively thin multi-layer cover assemblies are provided. The thicknesses of these cover layer assemblies range from about 0.015 inches to about 0.045 inches. Also, cover assemblies utilizing one or more thermoplastic polyurethanes are disclosed. The multi-layer core assembly used in the golf balls preferably exhibits a PGA compression of less than 85.

37 Claims, 1 Drawing Sheet

U.S. PATENT DOCUMENTS

| | | | |
|---|---|---|---|
| 3,502,338 A | 3/1970 | Cox | |
| 3,534,965 A | 10/1970 | Harrison et al. | |
| 3,572,721 A | 3/1971 | Harrison et al. | |
| 3,883,145 A | 5/1975 | Cox et al. | |
| 3,979,126 A | 9/1976 | Dusbiber | |
| 3,989,568 A | 11/1976 | Isaac | |
| 4,076,255 A | 2/1978 | Moore et al. | |
| 4,085,937 A | 4/1978 | Schenk | |
| 4,123,061 A | 10/1978 | Dusbiber | |
| 4,190,711 A | 2/1980 | Zdrahala et al. | |
| 4,218,543 A | 8/1980 | Weber et al. | |
| 4,248,432 A | 2/1981 | Hewitt et al. | |
| 4,272,079 A | 6/1981 | Nakade et al. | |
| 4,274,637 A | 6/1981 | Molitor | |
| 4,337,946 A | 7/1982 | Saito et al. | |
| 4,431,193 A * | 2/1984 | Nesbitt | 473/373 |
| 4,442,282 A | 4/1984 | Kolycheck | |
| 4,570,937 A | 2/1986 | Yamada | |
| 4,582,887 A | 4/1986 | Dominguez et al. | |
| 4,590,219 A | 5/1986 | Nissen et al. | |
| 4,607,090 A | 8/1986 | Dominguez | |
| 4,650,193 A | 3/1987 | Molitor et al. | |
| 4,674,751 A | 6/1987 | Molitor et al. | |
| 4,679,795 A | 7/1987 | Melvin et al. | |
| 4,688,801 A | 8/1987 | Reiter | |
| 4,690,981 A | 9/1987 | Statz | |
| 4,695,055 A | 9/1987 | Newcomb et al. | |
| 4,714,253 A | 12/1987 | Nakahara et al. | |
| 4,762,322 A | 8/1988 | Molitor et al. | |
| 4,798,386 A | 1/1989 | Berard | |
| 4,848,770 A | 7/1989 | Shama | |
| 4,852,884 A | 8/1989 | Sullivan | |
| 4,858,923 A | 8/1989 | Gobush et al. | |
| 4,858,924 A | 8/1989 | Saito et al. | |
| 4,878,674 A | 11/1989 | Newcomb et al. | |
| 4,884,814 A * | 12/1989 | Sullivan | 473/373 |
| 4,911,451 A | 3/1990 | Sullivan et al. | |
| 4,919,434 A * | 4/1990 | Saito | 473/373 |
| 4,957,297 A | 9/1990 | Newcomb et al. | |
| 4,979,746 A | 12/1990 | Gentiluomo | |
| 4,984,804 A | 1/1991 | Yamada et al. | |
| 4,986,545 A | 1/1991 | Sullivan | |
| 5,002,281 A | 3/1991 | Nakahara et al. | |
| 5,006,297 A | 4/1991 | Brown et al. | |
| 5,019,319 A | 5/1991 | Nakamura et al. | |
| 5,026,067 A | 6/1991 | Gentiluomo | |
| 5,035,425 A | 7/1991 | Edwards | |
| 5,045,591 A | 9/1991 | Meyer et al. | |
| 5,048,838 A | 9/1991 | Chikaraishi et al. | |
| 5,068,151 A | 11/1991 | Nakamura | |
| 5,072,944 A | 12/1991 | Nakahara et al. | |
| 5,096,201 A | 3/1992 | Egashira et al. | |
| 5,098,105 A | 3/1992 | Sullivan | |
| 5,104,126 A | 4/1992 | Gentiluomo | |
| 5,120,791 A | 6/1992 | Sullivan | |
| 5,142,835 A | 9/1992 | Mrocca | |
| 5,150,906 A | 9/1992 | Molitor et al. | |
| 5,156,405 A | 10/1992 | Kitaoh et al. | |
| 5,184,828 A | 2/1993 | Kim et al. | |
| 5,187,013 A | 2/1993 | Sullivan | |
| 5,197,740 A | 3/1993 | Pocklington et al. | |
| 5,219,973 A | 6/1993 | Slack et al. | |
| 5,222,739 A * | 6/1993 | Horiuchi et al. | 473/356 |
| 5,244,969 A | 9/1993 | Yamada | |
| 5,253,871 A * | 10/1993 | Viollaz | 473/374 |
| 5,273,286 A | 12/1993 | Sun | |
| 5,273,287 A | 12/1993 | Molitor et al. | |
| 5,274,041 A | 12/1993 | Yamada | |
| 5,281,651 A | 1/1994 | Arjunan et al. | |
| 5,300,334 A | 4/1994 | Niederst et al. | |
| 5,304,608 A | 4/1994 | Yabuki et al. | |
| 5,306,760 A | 4/1994 | Sullivan | |
| 5,312,857 A | 5/1994 | Sullivan | |
| 5,314,187 A * | 5/1994 | Proudfit | 473/378 |
| 5,324,783 A | 6/1994 | Sullivan | |
| 5,330,837 A | 7/1994 | Sullivan | |
| 5,334,673 A * | 8/1994 | Wu | 473/378 |
| 5,338,610 A | 8/1994 | Sullivan | |
| 5,368,304 A | 11/1994 | Sullivan et al. | |
| 5,368,806 A | 11/1994 | Harasin et al. | |
| 5,387,750 A | 2/1995 | Chiang | |
| 5,403,010 A | 4/1995 | Yabuki et al. | |
| 5,439,227 A | 8/1995 | Egashira et al. | |
| 5,480,155 A | 1/1996 | Molitor et al. | |
| 5,482,285 A | 1/1996 | Yabuki et al. | |
| 5,484,870 A | 1/1996 | Wu | |
| 5,490,673 A | 2/1996 | Hiraoka | |
| 5,490,674 A | 2/1996 | Hamada et al. | |
| 5,492,972 A | 2/1996 | Stefani | |
| 5,553,852 A | 9/1996 | Higuchi et al. | |
| 5,586,950 A | 12/1996 | Endo | |
| 5,628,699 A | 5/1997 | Maruko et al. | |
| 5,668,239 A | 9/1997 | Nodelman et al. | |
| 5,674,137 A | 10/1997 | Maruko et al. | |
| 5,688,191 A | 11/1997 | Cavallaro et al. | |
| 5,692,974 A | 12/1997 | Wu et al. | |
| 5,730,665 A | 3/1998 | Shimosaka et al. | |
| 5,733,206 A | 3/1998 | Nesbitt et al. | |
| 5,733,207 A | 3/1998 | Sullivan et al. | |
| 5,733,428 A | 3/1998 | Calabria et al. | |
| 5,739,247 A | 4/1998 | Lesko et al. | |
| 5,739,253 A | 4/1998 | Nodelman et al. | |
| 5,750,580 A | 5/1998 | Mayer et al. | |
| 5,759,676 A | 6/1998 | Cavallaro et al. | |
| 5,779,561 A | 7/1998 | Sullivan et al. | |
| 5,779,562 A | 7/1998 | Melvin et al. | |
| 5,779,563 A | 7/1998 | Yamagishi et al. | |
| 5,783,293 A | 7/1998 | Lammi | |
| 5,792,008 A | 8/1998 | Kakiuchi et al. | |
| 5,797,808 A | 8/1998 | Hayashi et al. | |
| 5,800,284 A | 9/1998 | Sullivan et al. | |
| 5,803,831 A | 9/1998 | Sullivan et al. | |
| 5,810,678 A | 9/1998 | Cavallaro et al. | |
| 5,813,923 A | 9/1998 | Cavallaro et al. | |
| 5,816,937 A | 10/1998 | Shimosaka et al. | |
| 5,820,488 A | 10/1998 | Sullivan et al. | |
| 5,820,489 A | 10/1998 | Sullivan et al. | |
| 5,820,491 A | 10/1998 | Hatch et al. | |
| 5,827,167 A | 10/1998 | Dougan et al. | |
| 5,830,087 A | 11/1998 | Sullivan et al. | |
| 5,833,553 A | 11/1998 | Sullivan et al. | |
| 5,833,554 A | 11/1998 | Sullivan et al. | |
| 5,836,833 A | 11/1998 | Shimosaka et al. | |
| 5,849,168 A | 12/1998 | Lutz | |
| 5,856,388 A | 1/1999 | Harris et al. | |
| 5,863,264 A | 1/1999 | Yamagishi et al. | |
| 5,873,796 A | 2/1999 | Cavallaro et al. | |
| 5,885,172 A | 3/1999 | Hebert et al. | |
| 5,888,437 A | 3/1999 | Calabria et al. | |
| 5,891,973 A | 4/1999 | Sullivan et al. | |
| 5,897,884 A | 4/1999 | Calabria et al. | |
| 5,899,822 A | 5/1999 | Yamagishi et al. | |
| 5,902,192 A | 5/1999 | Kashiwagi et al. | |
| 5,908,358 A | 6/1999 | Wu | |
| 5,919,100 A | 7/1999 | Boehm et al. | |
| 5,919,862 A | 7/1999 | Rajagopalan | |
| 5,922,252 A | 7/1999 | Stanton et al. | |
| 5,929,189 A | 7/1999 | Ichikawa et al. | |
| 5,935,021 A | 8/1999 | Kashiwagi et al. | |
| 5,947,842 A | 9/1999 | Cavallaro et al. | |
| 5,947,843 A | 9/1999 | Calabria et al. | |

| | | |
|---|---|---|
| 5,959,059 A | 9/1999 | Vedula et al. |
| 5,976,035 A | 11/1999 | Umezawa et al. |
| 5,984,807 A | 11/1999 | Wai et al. |
| 6,210,293 B1 * | 4/2001 | Sullivan ................... 473/374 |

OTHER PUBLICATIONS

A Properties Guide, "Engineering Polymers Thermoplastics and Thermosets," Miles Inc., 1–23 (1994).

Polyurethane Handbook, "Chemistry–Raw Materials–Processing Applications–Proeprties," edited by Oertel et al., Hanser/Gardner Publications, Inc., 101, 102 (1994).

A General Reference Manual, "The Chemistry of Polyurethane Coatings," Mobay Corporation, 1–16 (1988).

Product Announcement, "New Polyurea System Offering Rapid Mold Times and Excellent Thermal Stability for Automotive Fascias Is Introduced by Mobay," PRNewswire, Mar. 1, 1998.

Cytec Industries, Inc., "TMXDI®(META) Aliphatic Isocyanates," brochure, pp. 2–11, 9/94.

Bayer Corporation, "Engineering Polymers RIM and Part Mold Design," brochure, pp. 1–85, 5/95.

* cited by examiner

MULTI-LAYER GOLF BALL

CROSS REFERENCES TO RELATED APPLICATIONS

The present application is a continuation-in-part of U.S. application Ser. No. 09/776,278 filed on Feb. 2, 2001, which is a continuation of U.S. application Ser. No. 09/470,196 filed on Dec. 21, 1999, now U.S. Pat. No. 6,210,293, which is a continuation of U.S. application Ser. No. 08/870,585 filed Jun. 6, 1997 now abandoned, which is a continuation of U.S. application Ser. No. 08/556,237 filed on Nov. 9, 1995, now abandoned, which is a continuation-in-part of U.S. application Ser. No. 08/542,793 filed on Oct. 13, 1995, now abandoned, which is in turn a continuation-in-part of U.S. application Ser. No. 08/070,510 filed on Jun. 1, 1993, now abandoned.

FIELD OF THE INVENTION

The present invention relates to golf balls and, more particularly, to improved golf balls comprising multi-layer covers which, in several embodiments, are formed from particular combinations of ionomers and/or polyurethane based materials. In several of the embodiments, the cover layers are also relatively thin. And, in other embodiments of the present invention, the balls utilize a multi-layer core construction. The improved golf balls provide for enhanced distance and durability properties over conventional golf balls while at the same time offering enhanced "feel" and spin characteristics generally associated with soft balata and balata-like covers of the prior art.

BACKGROUND OF THE INVENTION

Traditional golf ball covers have been comprised of balata or blends of balata with elastomeric or plastic materials. The traditional balata covers are relatively soft and flexible. Upon impact, the soft balata covers compress against the surface of the club producing high spin. Consequently, the soft and flexible balata covers provide an experienced golfer with the ability to apply a spin to control the ball in flight in order to produce a draw or a fade, or a backspin which causes the ball to "bite" or stop abruptly on contact with the green. Moreover, the soft balata covers produce a soft "feel" to the low handicap player. Such playability properties (workability, feel, etc.) are particularly important in short iron play with low swing speeds and are exploited significantly by relatively skilled players.

Despite all the benefits of balata, balata covered golf balls are easily cut and/or damaged if mis-hit. Golf balls produced with balata or balata-containing cover compositions therefore have a relatively short lifespan.

As a result of this negative property, balata and its synthetic substitutes, transpolyisoprene and transpolybutadiene, have been essentially replaced as the cover materials of choice by new cover materials comprising ionomeric resins.

Ionomeric resins are polymers containing interchain ionic bonding. As a result of their toughness, durability and flight characteristics, various ionomeric resins sold by E. I. DuPont de Nemours & Company under the trademark Surlyn® and more recently, by the Exxon Corporation (see U.S. Pat. No. 4,911,451) under the trademarks Escor® and Iotek®, have become the materials of choice for the construction of golf ball covers over the traditional "balata" (transpolyisoprene, natural or synthetic) rubbers. As stated, the softer balata covers, although exhibiting enhanced playability properties, lack the durability (cut and abrasion resistance, fatigue endurance, etc.) properties required for repetitive play.

Ionomeric resins are generally ionic copolymers of an olefin, such as ethylene, and a metal salt of an unsaturated carboxylic acid, such as acrylic acid, methacrylic acid, or maleic acid. Metal ions, such as sodium or zinc, are used to neutralize some portion of the acidic group in the copolymer resulting in a thermoplastic elastomer exhibiting enhanced properties, i.e. durability, etc., for golf ball cover construction over balata. However, some of the advantages gained in increased durability have been offset to some degree by the decreases produced in playability. This is because although the ionomeric resins are very durable, they tend to be very hard when utilized for golf ball cover construction, and thus lack the degree of softness required to impart the spin necessary to control the ball in flight. Since the ionomeric resins are harder than balata, the ionomeric resin covers do not compress as much against the face of the club upon impact, thereby producing less spin. In addition, the harder and more durable ionomeric resins lack the "feel" characteristic associated with the softer balata related covers.

As a result, there are currently more than fifty (50) commercial grades of ionomers available both from DuPont and Exxon, with a wide range of properties which vary according to the type and amount of metal cations, molecular weight, composition of the base resin (i.e., relative content of ethylene and methacrylic and/or acrylic acid groups) and additive ingredients such as reinforcement agents, etc. However, a great deal of research continues in order to develop a golf ball cover composition exhibiting not only the improved impact resistance and carrying distance properties produced by the "hard" ionomeric resins, but also the playability (i.e., "spin", "feel", etc.) characteristics previously associated with the "soft" balata covers, properties which are still desired by the more skilled golfer.

Consequently, a number of two-piece (a solid resilient center or core with a molded cover) and three-piece (a liquid or solid center, elastomeric winding about the center, and a molded cover) golf balls have been produced by the present inventor and others to address these needs. The different types of materials utilized to formulate the cores, covers, etc. of these balls dramatically alter the balls' overall characteristics.

In addition, multi-layered covers containing one or more ionomer resins have also been formulated in an attempt to produce a golf ball having the overall distance, playability and durability characteristics desired. For example, this was addressed by Spalding Sports Worldwide, Inc., the assignee of the present invention, in U.S. Pat. No. 4,431,193 where a multi-layered, regular sized, golf ball is disclosed.

In the '193 patent, a multi-layer golf ball is produced by initially molding a first cover layer on a spherical core and then adding a second layer. The first layer is comprised of a hard, high flexural modulus resinous material such as type 1605 Surlyn® (now designated Surlyn® 8940). Type 1605 Surlyn® (Surlyn® 8940) is a sodium ion based low acid (less than or equal to 15 weight percent methacrylic acid) ionomer resin having a flexural modulus of about 51,000 psi. An outer layer of a comparatively soft, low flexural modulus resinous material such as type 1855 Surlyn® (now designated Surlyn® 9020) is molded over the inner cover layer. Type 1855 Surlyn® (Surlyn® 9020) is a zinc ion based low acid (10 weight percent methacrylic acid) ionomer resin having a flexural modulus of about 14,000 psi.

The '193 patent teaches that the hard, high flexural modulus resin which comprises the first layer provides for a gain in coefficient of restitution over the coefficient of restitution of the core. The increase in the coefficient of restitution provides a ball which serves to attain or approach the maximum initial velocity limit of 255 feet per second as provided by the United States Golf Association (U.S.G.A.) rules. The relatively soft, low flexural modulus outer layer provides essentially no gain in the coefficient of restitution but provides for the advantageous "feel" and playing characteristics of a balata covered golf ball.

Unfortunately, however, while a ball of the '193 patent does exhibit enhanced playability characteristics with improved distance (i.e. enhanced C.O.R. values) over a number of other then known multi-layered balls, the ball suffers from poor cut resistance and relatively short distance (i.e. lower C.O.R. values) when compared to two-piece, single cover layer balls commercially available today. These undesirable properties make the ball produced in accordance with the '193 patent unacceptable by today's standards.

The present invention is directed to new multi-layer golf ball compositions which provide for enhanced coefficient of restitution (i.e, enhanced resilience or carrying distance) and/or durability properties when compared to the multi-layer balls found in the prior art, as well as improved outer cover layer softness and durability. As such, the playability characteristics (i.e., "feel", "click", "spin", etc.) are not diminished.

These and other objects and features of the invention will be apparent from the following summary and description of the invention, the drawings and from the claims.

SUMMARY OF THE INVENTION

The present invention is directed to improved multi-layer golf ball cover compositions and the resulting multi-layer golf balls produced using the improved compositions. The present invention is also directed to improved multi-layer golf balls having particular properties and characteristics.

In a first aspect, the present invention provides a golf ball comprising a multi-layer core assembly that includes a center core component and a core layer disposed about the center core component. The golf ball further comprises a multi-layer cover assembly including an inner cover layer disposed on the core layer and an outer cover layer disposed on the inner cover layer. The golf ball is characterized by one or both of the inner cover layer and outer cover layer comprising a blend of less than 50 percent of a high acid ionomer and greater than 50 percent of a low acid ionomer.

In yet another aspect, the present invention provides a golf ball comprising a multi-layer core assembly having a center core component and a core layer disposed about the center core component. The golf ball further includes a multi-layer cover assembly including an inner cover layer disposed about the core assembly and an outer cover layer disposed on the inner cover layer. One or both of the inner cover layer and outer cover layer comprise a thermoplastic polyurethane.

In yet another aspect, the present invention provides a golf ball that includes a multi-layer core assembly comprising a center core component and a core layer disposed on the center core component. The golf ball further includes a multi-layer cover assembly formed about the multi-layer core assembly. The multi-layer cover assembly comprises an inner cover layer disposed on the core layer and an outer cover layer disposed on the inner cover layer. The multi-layer core assembly exhibits a PGA compression of less than 85.

It will be understood that these figures are not necessarily to scale. These figures are presented to illustrate several of the preferred embodiments according to the present invention.

DETAILED DESCRIPTION OF THE PREFERRED EMBODIMENTS

Figure 1:
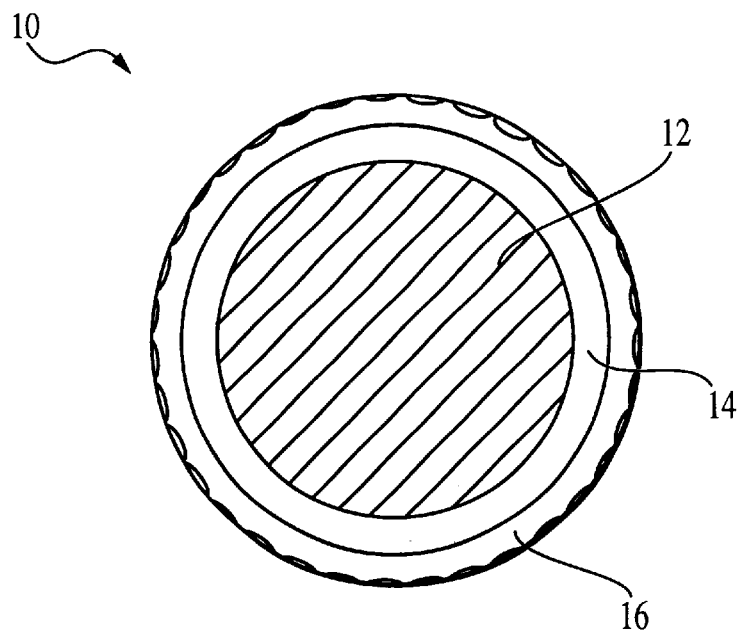
FIG. 1 is a cross-sectional view of a preferred embodiment golf ball in accordance with the present invention.
Figure 2:
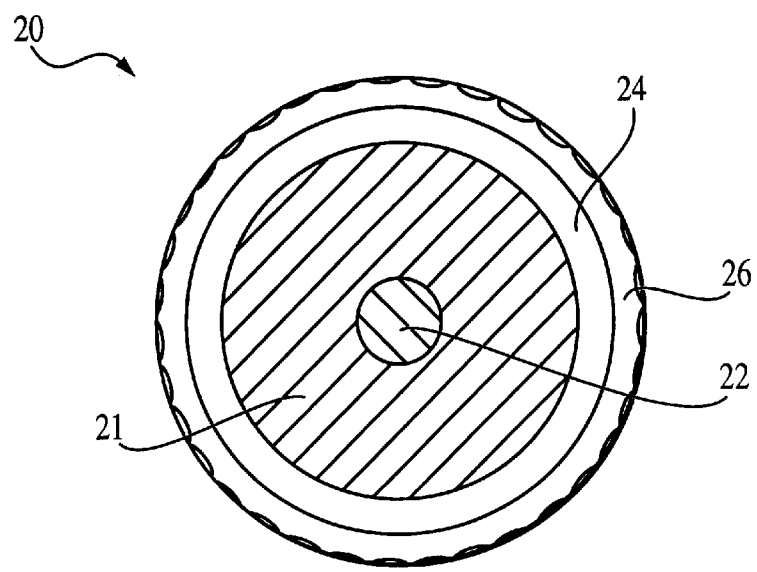
FIG. 2 is a cross-sectional view of another preferred embodiment ball in accordance with the present invention.

Referring to FIG. 1, the present invention relates to improved multi-layer golf balls, particularly a golf ball 10 comprising a multi-layered cover disposed about a solid core 12, and methods for making same. The multi-layered cover comprises two layers: a first or inner layer or ply 14 and a second or outer layer or ply 16. FIG. 2 illustrates another preferred embodiment golf ball 20. That ball utilizes a multi-layer core assembly having a center core component 22 and a core layer 21 disposed about the center core component 22. The ball 20 also comprises a multi-layer cover assembly having an inner cover layer 24 disposed on the core layer 21, and an outer cover layer 26 formed about the inner cover layer 24.

The present invention golf balls include several preferred embodiments as follows. A first preferred embodiment is a multi-layer golf ball that utilizes a blend of ionomers in either or both of the cover layers, e.g. the inner cover layer 14 and/or the outer cover layer 16, and most preferably, a minor percentage of high acid ionomers with a major percentage of low acid ionomers. Additional variations of this preferred embodiment include the use of other ionomers or blends of ionomer resins.

The present invention provides another set of preferred embodiment golf balls that utilize relatively thin cover layers. Specifically, these embodiments are golf balls having multi-layer cover assemblies with thicknesses ranging from about 0.015 to about 0.045 inches, preferably from about 0.025 to about 0.035 inches, and most preferably from about 0.030 to about 0.035 inches. These thicknesses are the total thickness of the inner and outer cover layers. For example, referring to FIG. 1, the noted thicknesses are the total thickness of cover layers 14 and 16. In these embodiments utilizing such thin cover assemblies, each of the outer and inner layers is fairly thin (i.e. from about 0.005 inches to about 0.030 inches in thickness, more desirably 0.010 to 0.020 inches in thickness for a 1.680 inch diameter ball and 0.015 to 0.030 inches in thickness for a 1.72 inch diameter ball), but thick enough to achieve desired playability characteristics while minimizing expense.

The present invention further provides another set of preferred embodiment golf balls that utilize cover layers based upon specific polyurethane materials, such as aliphatic non-yellowing thermoplastic polyurethanes. These polyurethane materials may be incorporated in either or both of the inner cover layer 14 and/or the outer cover layer 16 of the ball 10 illustrated in FIG. 2. These particular polyurethane covers can be formed from a wide variety of techniques such as casting and by reaction injection molding (RIM), described in greater detail herein.

In yet another group of preferred embodiments, the present invention provides golf balls that utilize a relatively soft polyurethane in one or more cover layers. The particular type of soft polyurethane is a reaction product of an ethylene acrylic or methacrylic acid ionomer that is neutralized from about 0 to about 80% with a magnesium, zinc, lithium or sodium ion and an isocyanate prepolymer. Optionally, an acrylate may be utilized in forming the reaction product.

This material may be incorporated in either or both of the inner cover layer 14 and/or the outer cover layer 16 of the ball illustrated in FIG. 1.

And, the present invention provides yet another set of preferred embodiment balls in which the balls utilize multi-layer cores and most preferably, cores that employ a soft center component. The PGA compression of such multi-layer cores preferably is less than about 85. FIG. 2 illustrates a preferred multi-layer core assembly in accordance with the present invention.

It is particularly preferred to utilize a blend of one or more low acid ionomers with a soft polyurethane based elastomer. The use of a low acid ionomer blend with a soft, relatively low modulus ionomer, polyurethane based elastomer in one or more cover layers provides for good overall coefficient of restitution (i.e., enhanced resilience) while at the same time providing improved compression and spin. The use of a multi-layer core further promotes increased versatility and generally improved performance of the resulting golf ball.

Two principal properties involved in golf ball performance are resilience and hardness. Resilience is determined by the coefficient of restitution (C.O.R.), the constant "e" which is the ratio of the relative velocity of two elastic spheres after direct impact to that before impact. As a result, the coefficient of restitution ("e") can vary from 0 to 1, with 1 being equivalent to an elastic collision and 0 being equivalent to an inelastic collision.

Resilience (C.O.R.), along with additional factors such as club head speed, angle of trajectory and ball configuration (i.e., dimple pattern) generally determine the distance a ball will travel when hit. Since club head speed and the angle of trajectory are factors not easily controllable by a manufacturer, factors of concern among manufacturers are the coefficient of restitution (C.O.R.) and the surface configuration of the ball.

The coefficient of restitution (C.O.R.) in solid core balls is a function of the composition of the molded core and of the cover. In balls containing a wound core (i.e., balls comprising a liquid or solid center, elastic windings, and a cover), the coefficient of restitution is a function of not only the composition of the center and cover, but also the composition and tension of the elastomeric windings. Although both the core and the cover contribute to the coefficient of restitution, the present invention is directed to the enhanced coefficient of restitution (and thus travel distance) which is affected by the cover component.

In this regard, the coefficient of restitution of a golf ball is generally measured by propelling a ball at a given speed against a hard surface and measuring the ball's incoming and outgoing velocities electronically. As mentioned above, the coefficient of restitution is the ratio of the outgoing velocity to the incoming velocity. The coefficient of restitution must be carefully controlled in all commercial golf balls in order for the ball to be within the specifications regulated by the United States Golf Association (U.S.G.A.). Along this line, the U.S.G.A. standards indicate that a "regulation" ball cannot have an initial velocity (i.e., the speed off the club) exceeding 255 feet per second. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

The hardness of the ball is the second principal property involved in the performance of a golf ball. The hardness of the ball can affect the playability of the ball on striking and the sound or "click" produced. Hardness is determined by the deformation (i.e., compression) of the ball under various load conditions applied across the ball's diameter (i.e., the lower the compression value, the harder the material). As indicated in U.S. Pat. No. 4,674,751, softer covers permit the accomplished golfer to impart proper spin. This is because the softer covers deform on impact significantly more than balls having "harder" ionomeric resin covers. As a result, the better player is allowed to impart fade, draw or backspin to the ball thereby enhancing playability. Such properties may be determined by various spin rate tests such as the "nine iron" spin rate test described below in the Examples.

Accordingly, the present invention is directed to an improved multi-layer cover which produces, upon molding each layer around a core (preferably a solid core or a solid multi-layer core) to formulate a multi-layer cover, a golf ball exhibiting enhanced distance (i.e., resilience) without adversely affecting, and in many instances, improving the ball's playability (hardness/softness) and/or durability (i.e., cut resistance, fatigue resistance, etc.) characteristics.

Multi-Layer Cover Assembly Ionomeric Materials

The low acid ionomers which may be suitable for use in formulating the cover layer compositions of the subject invention are ionic copolymers which are the metal, i.e., sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e., iso- or n-butylacrylate, etc.) can also be included to produce a softer terpolymer. The carboxylic acid groups of the copolymer are partially neutralized (i.e., approximately 0–80%) by the metal ions. Each of the low acid ionomer resins which may be included in the cover layer compositions of the invention contains 16% by weight or less of a carboxylic acid.

The cover layer compositions include the low acid ionomers such as those developed and sold by E.I. DuPont de Nemours & Company under the trademark Surlyn® and by Exxon Corporation under the trademarks Escor® or Iotek®, or blends thereof.

The low acid ionomeric resins available from Exxon under the designation Escor® and or Iotek®, are somewhat similar to the low acid ionomeric resins available under the Surlyn® trademark. However, since the Escor®/Iotek® ionomeric resins are sodium or zinc salts of poly(ethylene-acrylic acid) and the Surlyn® resins are zinc, sodium, magnesium, etc. salts of poly(ethylene-methacrylic acid), distinct differences in properties exist.

When utilized in the construction of the cover layer of a golf ball, it has been found that the low acid ionomer blends extend the range of compression and spin rates beyond that previously obtainable. More preferably, it has been found that when two or more low acid ionomers, particularly blends of sodium and zinc low acid ionomers, are processed to produce the covers of multi-layered golf balls, the resulting golf balls will travel further and at an enhanced spin rate than previously known multi-layered golf balls. Such an improvement is particularly noticeable in enlarged or over-sized golf balls.

For example, the normal size, multi-layer golf ball taught in 4,650,193 does not incorporate blends of low acid ionomeric resins of the present invention in the inner cover layer.

In addition, the multi-layered ball disclosed in the '193 patent suffers substantially in durability in comparison with the present invention golf balls.

Furthermore, use of a cover layer formulated from blends of lower acid ionomers produces multi-layer golf balls having enhanced compression and spin rates. These are the properties desired by the more skilled golfer.

In a preferred embodiment of the present invention, a golf ball with a multi-layer cover assembly is provided. In this particular embodiment, one of the cover layers is comparatively softer than another cover layer in the multi-layer assembly. The softness provides for the enhanced feel and playability characteristics typically associated with balata or balata-blend balls. The soft layer, i.e. preferably the outer layer or ply, is comprised of a relatively soft, low modulus (about 1,000 psi to about 10,000 psi) and low acid (less than 16 weight percent acid) ionomer, ionomer blend or a non-ionomeric elastomer such as, but not limited to, a polyurethane, a polyester elastomer such as that marketed by DuPont under the trademark Hytrel®, a polyurethane sold by BASF under the designation Baytec® or a polyether amide such as that marketed by Elf Atochem S. A. under the trademark Pebax®.

In another preferred embodiment, one or more of the cover layers includes a blend of hard and soft (low acid) ionomer resins such as those described in U.S. Pat. Nos. 4,884,814 and 5,120,791, both incorporated herein by reference. Specifically, a desirable material for use in molding the cover layer comprises a blend of a high modulus (hard), low acid, ionomer with a low modulus (soft) low acid, ionomer to form a base ionomer mixture. A high modulus ionomer herein is one which measures from about 15,000 to about 70,000 psi as measured in accordance with ASTM method D-790. The hardness may be defined as at least 50 on the Shore D scale as measured in accordance with ASTM method D-2240. A low modulus ionomer suitable for use in the outer layer blend has a flexural modulus measuring from about 1,000 to about 10,000 psi, with a hardness of about 20 to about 40 on the Shore D scale.

The hard ionomer resins utilized to produce the cover layer composition hard/soft blends include ionic copolymers which are the sodium, zinc, magnesium or lithium salts of the reaction product of an olefin having from 2 to 8 carbon atoms and an unsaturated monocarboxylic acid having from 3 to 8 carbon atoms. The carboxylic acid groups of the copolymer may be totally or partially (i.e. approximately 15–75 percent) neutralized.

The hard ionomeric resins are likely copolymers of ethylene and either acrylic and/or methacrylic acid, with copolymers of ethylene and acrylic acid being the most preferred. Two or more types of hard ionomeric resins may be blended into the outer cover layer compositions in order to produce the desired properties of the resulting golf balls.

As discussed earlier herein, the hard ionomeric resins introduced under the designation Escor® and sold under the designation Iotek® are somewhat similar to the hard ionomeric resins sold under the Surlyn® trademark. However, since the Iotek® ionomeric resins are sodium or zinc salts of poly(ethylene-acrylic acid) and the Surlyn® resins are zinc or sodium salts of poly(ethylene-methacrylic acid) some distinct differences in properties exist. As more specifically indicated in the data set forth below, the hard Iotek® resins (i.e., the acrylic acid based hard ionomer resins) are the more preferred hard resins for use in formulating the cover layer blends for use in the present invention. In addition, various blends of Iotek® and Surlyn® hard ionomeric resins, as well as other available ionomeric resins, may be utilized in the present invention in a similar manner.

Examples of commercially available hard ionomeric resins which may be used in the present invention in formulating the inner and outer cover blends include the hard sodium ionic copolymer sold under the trademark Surlyn® 8940 and the hard zinc ionic copolymer sold under the trademark Surlyn® 9910. Surlyn® 8940 is a copolymer of ethylene with methacrylic acid and about 15 weight percent acid which is about 29 percent neutralized with sodium ions. This resin has an average melt flow index of about 2.8 gm/10 min. Surlyn® 9910 is a copolymer of ethylene and methacrylic acid with about 15 weight percent acid which is about 58 percent neutralized with zinc ions. The average melt flow index of Surlyn® 9910 is about 0.7 gm/10 min. The typical properties of Surlyn® 9910 and 8940 are set forth below in Table 1:

TABLE 1

Typical Properties of Commercially Available Hard Surlyn ® Resins Suitable for Use in the Cover Layers of the Present Invention

| | ASTM D | 8940 | 9910 | 8920 | 8528 | 9970 | 9730 |
|---|---|---|---|---|---|---|---|
| Cation Type | | Sodium | Zinc | Sodium | Sodium | Zinc | Zinc |
| Melt flow index, gms/10 min. | D-1238 | 2.8 | 0.7 | 0.9 | 1.3 | 14.0 | 1.6 |
| Specific Gravity, g/cm$^3$ | D-792 | 0.95 | 0.97 | 0.95 | 0.94 | 0.95 | 0.95 |
| Hardness, Shore D | D-2240 | 66 | 64 | 66 | 60 | 62 | 63 |
| Tensile Strength, (kpsi), MPa | D-638 | (4.8) 33.1 | (3.6) 24.8 | (5.4) 37.2 | (4.2) 29.0 | (3.2) 22.0 | (4.1) 28.0 |
| Elongation, % | D-638 | 470 | 290 | 350 | 450 | 460 | 460 |
| Flexural Modulus, (kpsi) MPa | D-790 | (51) 350 | (48) 330 | (55) 380 | (32) 220 | (28) 190 | (30) 210 |
| Tensile Impact (23° C.) KJ/m$_2$ (ft.-lbs./in$^2$) | D-1822S | 1020 (485) | 1020 (485) | 865 (410) | 1160 (550) | 760 (360) | 1240 (590) |
| Vicat Softening Temperature, ° C. | D-1525 | 63 | 62 | 58 | 73 | 61 | 73 |

Examples of the more pertinent acrylic acid based hard ionomer resins suitable for use in the present inner and outer cover composition sold under the Iotek® trademark by the Exxon Corporation include Iotek® 4000, Iotek® 4010, Iotek® 8000, Iotek® 8020 and Iotek® 8030. The typical properties of these and other Iotek® hard ionomers suited for use in formulating the inner and outer layer cover composition are set forth below in Table 2:

TABLE 2

Typical Properties of Iotek ® Ionomers

| | ASTM Method | Units | 4000 | 4010 | 8000 | 8020 | 8030 |
|---|---|---|---|---|---|---|---|
| Resin Properties | | | | | | | |
| Cation type | | | zinc | zinc | sodium | sodium | sodium |
| Melt index | D-1238 | g/10 min. | 2.5 | 1.5 | 0.8 | 1.6 | 2.8 |
| Density | D-1505 | kg/m$^3$ | 963 | 963 | 954 | 960 | 960 |
| Melting Point | D-3417 | °C. | 90 | 90 | 90 | 87.5 | 87.5 |
| Crystallization Point | D-3417 | °C. | 62 | 64 | 56 | 53 | 55 |
| Vicat Softening Point | D-1525 | °C. | 62 | 63 | 61 | 64 | 67 |
| % Weight Acrylic Acid | | | 16 | | 11 | | |
| % of Acid Groups cation neutralized | | | 30 | | 40 | | |
| Plaque Properties (3 mm thick, compression molded) | | | | | | | |
| Tensile at break | D-638 | MPa | 24 | 26 | 36 | 31.5 | 28 |
| Yield point | D-638 | MPa | none | none | 21 | 21 | 23 |
| Elongation at break | D-638 | % | 395 | 420 | 350 | 410 | 395 |
| 1% Secant modulus | D-638 | MPa | 160 | 160 | 300 | 350 | 390 |
| Shore Hardness D | D-2240 | — | 55 | 55 | 61 | 58 | 59 |
| Film Properties (50 micron film 2.2:1 Blow-up ratio) | | | | | | | |
| Tensile at Break | | | | | | | |
| MD | D-882 | MPa | 41 | 39 | 42 | 52 | 47.4 |
| TD | D-882 | MPa | 37 | 38 | 38 | 38 | 40.5 |
| Yield point | | | | | | | |
| MD | D-882 | MPa | 15 | 17 | 17 | 23 | 21.6 |
| TD | D-882 | MPa | 14 | 15 | 15 | 21 | 20.7 |
| Elongation at Break | | | | | | | |
| MD | D-882 | % | 310 | 270 | 260 | 295 | 305 |
| TD | D-882 | % | 360 | 340 | 280 | 340 | 345 |
| 1% Secant modulus | | | | | | | |
| MD | D-882 | MPa | 210 | 215 | 390 | 380 | 380 |
| TD | D-882 | MPa | 200 | 225 | 380 | 350 | 345 |
| Dart Drop Impact | D-1709 | g/micron | 12.4 | 12.5 | 20.3 | | |

| | ASTM Method | Units | 7010 | 7020 | 7030 |
|---|---|---|---|---|---|
| Resin Properties | | | | | |
| Cation type | | | zinc | zinc | zinc |
| Melt Index | D-1238 | g/10 min. | 0.8 | 1.5 | 2.5 |
| Density | D-1505 | kg/m$^3$ | 960 | 960 | 960 |
| Melting Point | D-3417 | °C. | 90 | 90 | 90 |
| Vicat Softening Point | D-1525 | °C. | 60 | 63 | 62.5 |
| Plaque Properties (3 mm thick, compression molded) | | | | | |
| Tensile at break | D-638 | MPa | 38 | 38 | 38 |
| Yield Point | D-638 | MPa | none | none | none |
| Elongation at break | D-638 | % | 500 | 420 | 395 |
| Shore Hardness D | D-2240 | — | 57 | 55 | 55 |

Comparatively, soft ionomers may be used in formulating the hard/soft blends of the inner and outer cover composition. These ionomers include acrylic acid based soft ionomers. They are generally characterized as comprising sodium or zinc salts of a terpolymer of an olefin having from about 2 to 8 carbon atoms, acrylic acid, and an unsaturated monomer of the acrylate ester class having from 1 to 21 carbon atoms. The soft ionomer is preferably a zinc based ionomer made from an acrylic acid base polymer in an unsaturated monomer of the acrylate ester class. The soft (low modulus) ionomers have a hardness from about 20 to about 40 as measured on the Shore D scale and a flexural modulus from about 1,000 to about 10,000, as measured in accordance with ASTM method D-790.

Certain ethylene-acrylic acid based soft ionomer resins developed by the Exxon Corporation under the designation Iotek® 7520 (referred to experimentally by differences in neutralization and melt indexes as LDX 195, LDX 196, LDX 218 and LDX 219) may be combined with known hard ionomers such as those indicated above to produce the inner and outer cover layers. The combination produces higher C.O.R.s at equal or softer hardness, higher melt flow (which corresponds to improved, more efficient molding, i.e., fewer rejects) as well as significant cost savings versus the outer layer of multi-layer balls produced by other known hard-soft ionomer blends as a result of the lower overall raw materials costs and improved yields.

While the exact chemical composition of the resins to be sold by Exxon under the designation Iotek® 7520 is considered by Exxon to be confidential and proprietary information, Exxon's experimental product data sheet lists the following physical properties of the ethylene acrylic acid zinc ionomer developed by Exxon:

TABLE 3

| Property | ASTM Method | Units | Typical Value |
|---|---|---|---|
| Physical Properties of Iotek ® 7520 | | | |
| Melt Index | D-1238 | g/10 min. | 2 |
| Density | D-1505 | kg/m$^3$ | 0.962 |
| Cation | | | Zinc |
| Melting Point | D-3417 | °C. | 66 |
| Crystallization Point | D-3417 | °C. | 49 |
| Vicat Softening Point | D-1525 | °C. | 42 |
| Plaque Properties (2 mm thick Compression Molded Plaques) | | | |
| Tensile at Break | D-638 | MPa | 10 |
| Yield Point | D-638 | MPa | None |
| Elongation at Break | D-638 | % | 760 |
| 1% Secant Modulus | D-638 | MPa | 22 |
| Shore D Hardness | D-2240 | | 32 |
| Flexural Modulus | D-790 | MPa | 26 |
| Zwick Rebound | ISO 4862 | % | 52 |
| De Mattia Flex Resistance | D-430 | Cycles | >5000 |

In addition, test data collected by the Assignee indicates that Iotek® 7520 resins have Shore D hardnesses of about 32 to 36 (per ASTM D-2240), melt flow indexes of 3±0.5 g/10 min (at 190° C. per ASTM D-1288), and a flexural modulus of about 2500–3500 psi (per ASTM D-790). Furthermore, testing by an independent testing laboratory by pyrolysis mass spectrometry indicates that Iotek® 7520 resins are generally zinc salts of a terpolymer of ethylene, acrylic acid, and methyl acrylate.

Furthermore, it has been found that a grade of an acrylic acid based soft ionomer available from the Exxon Corporation under the designation Iotek® 7510, is also effective, when combined with the hard ionomers indicated above in producing golf ball covers exhibiting higher C.O.R. values at equal or softer hardness than those produced by known hard-soft ionomer blends. In this regard, Iotek® 7510 has the advantages (i.e. improved flow, higher C.O.R. values at equal hardness, increased clarity, etc.) produced by the Iotek® 7520 resin when compared to the methacrylic acid base soft ionomers known in the art (such as the Surlyn® 8625 and the Surlyn® 8629 combinations disclosed in U.S. Pat. No. 4,884,814).

In addition, Iotek® 7510, when compared to Iotek® 7520, produces slightly higher C.O.R. valves at equal softness/hardness due to the Iotek® 7510's higher hardness and neutralization. Similarly, Iotek® 7510 produces better release properties (from the mold cavities) due to its slightly higher stiffness and lower flow rate than Iotek® 7520. This is important in production where the soft covered balls tend to have lower yields caused by sticking in the molds and subsequent punched pin marks from the knockouts.

According to Exxon, Iotek® 7510 is of similar chemical composition as Iotek® 7520 (i.e. a zinc salt of a terpolymer of ethylene, acrylic acid, and methyl acrylate) but is more highly neutralized. Based upon FTIR analysis, Iotek® 7520 is estimated to be about 30–40 wt.-% neutralized and Iotek® 7510 is estimated to be about 40–60 wt.-% neutralized. The typical properties of Iotek® 7510 in comparison of those of Iotek® 7520 are set forth below:

TABLE 4

Physical Properties of Iotek ® 7510 in Comparison to Iotek ® 7520

| | IOTEK ® 7520 | IOTEK ® 7510 |
|---|---|---|
| MI, g/10 min | 2.0 | 0.8 |
| Density, g/cc | 0.96 | 0.97 |
| Melting Point, ° F. | 151 | 149 |
| Vicat Softening Point, ° F. | 108 | 109 |
| Flex Modulus, psi | 3800 | 5300 |
| Tensile strength, psi | 1450 | 1750 |
| Elongation, % | 760 | 690 |
| Hardness, Shore D | 32 | 35 |

It has been determined that when high acid/low acid ionomer blends are used for the cover layers, good results are achieved when the relative combination is in a range of about 1 to about 49 percent high acid ionomer and about 51 to about 99 percent low acid ionomer. The results are improved by adjusting the range to about 10 to 40 percent high acid ionomer and 60 to 90 percent low acid ionomer. Even better results are noted at relative ranges of about 20 to 35 percent high acid ionomer resin and about 80 to 65 percent low acid ionomer resin.

Specific formulations which may be used in the cover composition are included in the examples set forth in U.S. Pat. Nos. 5,120,791 and 4,884,814. The present invention is in no way limited to those examples.

Polyurethane Materials

A wide array of polyurethane materials may be utilized in the present invention golf balls. Before turning attention to these materials, it is instructive to consider the various features and terminology of polyurethanes.

Polyurethanes are polymers which are used to form a broad range of products. They are generally formed by mixing two primary ingredients during processing. For the most commonly used polyurethanes, the two primary ingredients are a polyisocyanate (for example, diphenylmethane diisocyanate monomer ("MDI") and toluene diisocyanate ("TDI") and their derivatives) and a polyol (for example, a polyester polyol or a polyether polyol).

A wide range of combinations of polyisocyanates and polyols, as well as other ingredients, are available. Furthermore, the end-use properties of polyurethanes can be controlled by the type of polyurethane utilized, i.e., whether the material is thermoset (crosslinked molecular structure) or thermoplastic (linear molecular structure).

Crosslinking occurs between the isocyanate groups (—NCO) and the polyol's hydroxyl end-groups (—OH). Additionally, the end-use characteristics of polyurethanes can also be controlled by different types of reactive chemicals and processing parameters. For example, catalysts are utilized to control polymerization rates. Depending upon the processing method, reaction rates can be very quick (as in the case for some reaction injection molding systems—"RIM") or may be on the order of several hours or longer (as in several coating systems). Consequently, a great variety of polyurethanes are suitable for different end uses.

Polyurethane has been used for golf balls and other game balls as a cover material. Commercially available polyurethane golf balls have been made of thermoset polyurethanes. A polyurethane becomes irreversibly "set" when a polyurethane prepolymer is crosslinked with a polyfunctional curing agent, such as polyamine and polyol. The prepolymer typically is made from polyether or polyester. Diisocyanate polyethers are preferred because of their water resistance.

The physical properties of thermoset polyurethanes are controlled substantially by the degree of crosslinking. Tightly crosslinked polyurethanes are fairly rigid and strong. A lower amount of crosslinking results in materials that are flexible and resilient. Thermoplastic polyurethanes have some crosslinking, but purely by physical means. The crosslinking bonds can be reversibly broken by increasing temperature, as occurs during molding or extrusion. In this regard, thermoplastic polyurethanes can be injection molded, and extruded as sheet and blown film. They can be used to up to about 350° F. and are available in a wide range of hardnesses.

Polyurethanes typically are formed by reacting a polyol with a polyisocyanate. In some cases, the polyisocyanate is in the form of a polyurethane prepolymer formed from a polyether or polyester and a polyisocyanate. The polyol or polyamine is typically referred to as a "curing" agent. Examples of reactants used to form polyurethanes by this technique are discussed in U.S. Pat. No. 5,006,297, herein incorporated by reference. In other cases a polyester or acrylic polyol is reacted with a polyisocyanate.

Two types of polyisocyanates are predominantly used to make polyurethanes, diphenylmethane diisocyanate monomer (MDI) and its derivatives, and toluene diisocyanate (TDI) and its derivatives. Other polyisocyanates may also be used such as, but not limited to p-phenylene diisocyanate (PPDI) (CAS Registry No. 104-49-4); toluene diisocyanate (TDI) (CAS Registry No. 1321-38-6); 4,4'-methylenebis-(phenylisocyanate) (MDI) (CAS Registry No. 101-68-8); polymethylene polyphenyl isocyanate (PMDI) (CAS Registry No. 9016-87-9); 1,5-naphthalene diisocyanate (NDI) (CAS Registry No. 3173-72-6); bitolylene diisocyanate (TODI) (CAS Registry No. 91-97-4); m-xylylene diisocyanate (XDI) (CAS Registry No. 3634-83-1); m-tetramethylxylylene (TMXDI) (CAS Registry No. 58067-42-8); hexamethylene diisocyanate (HDI) (CAS Registry No. 822-06-0); 1,6-diisocyanato-2,2,4,4-tetra-methylhexane (TMDI) (CAS Registry No. 83748-30-5); 1,6-diisocyanato-2,4,4-trimethylhexane (TMDI) (CAS Registry No. 15646-96-5); trans-cyclohexane-1,4-diisocyanate (CHDI) (CAS Registry No. 2556-36-7); 1,3-bis(isocyanato-methyl)cyclohexane (HXDI) (CAS Registry No. 38661-72-2); 3-isocyanato-methyl-3,5,5-trimethylcyclo-hexyl isocyanate (IPDI) (CAS Registry No. 4098-71-9); dicyclohexylmethane diisocyanate (HMDI) (CAS Registry No. 5124-30-1).

MDI is the most widely used polyisocyanate. Both rigid and flexible foams, reaction injection moldings, elastomers, coatings, and casting compounds are made from MDI. There are three basic grades of MDI: polymeric MDI, pure MDI, and pure MDI derivatives.

Polymeric MDI is used in both cellular and non-cellular products. However, because of the high thermal insulation properties possible with polymeric MDI, its main use is in closed-cell, rigid foam insulation for the construction and refrigeration industries. Other uses are high-resilience (HR) flexible foam, carpet backing, and binders.

Pure MDI, which is produced from polymeric MDI, is a low-melting-temperature (about 100° F.) solid. Its primary use is in thermoplastic and cast elastomers. It also is used as an additive for synthetic fibers to achieve high fiber tenacity and elongation.

Pure MDI derivatives are tailored to provide specific processing and reaction characteristics. A major use for these solvent-free liquids is in reaction injection molding (RIM), but they also find application in integral skin moldings, semi-flexible moldings, and cast elastomers.

Toluene diisocyanate, TDI, is used almost exclusively to make flexible foam. TDI, however, also finds some use in elastomers, sealants, and coatings. TDI's generally are water-white liquids which have much higher isocyanate (—NCO) content than any MDI, but lower molecular weights.

MDI and TDI also are blended, particularly for producing flexible molded foams. The free-flowing, brown liquid blends have nearly as high isocyanate contents as TDI.

Two basic types of polyols are used in polyurethanes systems: polyesters and polyethers. Polyethers are the most widely used.

Often in referring to polyols, their functionality is specified. The functionality pertains to the number of reactive sites, which in turn, controls crosslinking. The more crosslinked (higher functionality), the more rigid will be the polyurethane. Functionality is controlled by the initiator used to manufacture the polyol. Glycerine, for example, is commonly used to initiate triol (3 functional) polyols. To this initiator is added an oxide such as propylene oxide, ethylene oxide, or a combination, to extend the molecular chain and tailor final processing and performance characteristics of the polyol. Triols typically are used to produce flexible foams; diols are used for elastomers, coatings, and sealants; and tetrols typically are used for rigid foams.

Polyether-based polyols have greater resistance to hydrolysis. Polyether polyols can be modified by the in-situ polymerization of acrylonitrile/styrene monomers. The resulting graft polyols generally produce flexible foams with improved load-bearing properties as well as greater tensile and tear strengths. Depending on the backbone on which these monomers are grafted, a wide range of performance characteristics can be developed.

Polyester polyols yield polyurethanes with greater strength properties, wear resistance, and thermal stability than polyether polyurethanes, and they can absorb more energy. These materials, however, are generally more expensive than polyethers.

Polyester polyols are typically classed by molecular weight. Low molecular weight polyols (less than 1500) are used in coatings, casting compounds, and rigid foams. Medium molecular weight polyols (1550 to 2500) are used in elastomers. And, high molecular weight polyols (greater than 2500) are used in flexible foams.

Thermoset polyurethanes are typically crosslinked and cannot be repeatedly thermoformed. On the other hand, thermoplastic polyurethanes are similar to other thermoplastics in that they can be repeatedly plasticized by the influence of temperature and pressure.

The crosslinkable thermoplastic polyurethane used to form a golf ball according to the present invention is initially a thermoplastic, and in this state can be melted and solidified repeatedly. However, the material can be readily crosslinked, thereby increasing its hardness and providing that it cannot be reversibly melted without thermal degradation.

A wide array of crosslinkable thermoplastic polyurethanes can be used in the present invention. For example, EBXL-TPU is a thermoplastic polyurethane recently made available from Zylon Polymers, 23 Mountain Avenue, Monsey, N.Y. 10952. EBXL-TPU is a pelletized, medical grade, polyether or polyester based thermoplastic polyurethane, reactor modified to allow crosslinking by ionizing radiation. It is a low melt index material suitable for extrusion into profiles, film and sheet, or injection molding. Once crosslinked, the material combines the ease of processing and toughness of TPU with the improved resistance to water, solvents and elevated temperatures characteristic of thermoset materials. Table 5 below sets forth details of this preferred material.

TABLE 5

EBXL - TPU
Typical Physical Properties

| PROPERTY | VALUE | UNITS |
|---|---|---|
| Radiation | 12.5–15 | MegaRads |
| Shore Hardness | 80 | Shore A |
| Specific Gravity | 1.04 | gr/cc |
| Tensile Strength | 5000 | psi |
| Ultimate Elongation | 425 | % |
| Compression set, 70 hrs @ 100 deg C. | 50 | % |
| Melt Flow Index | 2 | gms/10 min |
| FLUID RESISTANCES | | |
| Water, 24 hrs @ 23 C. | no effect | |
| Isopropyl Alcohol, 100% 24 hrs @ 23 C. | no effect | |
| Tetrahydrofuran, 24 hrs @ 23 C. | swells, does not dissolve | |

A further preferred class of crosslinkable thermoplastic polyurethanes is a commercially available polyurethane from BASF, designated as Elastollan®. Properties of several specific formulations of Elastollan® polyurethanes are set forth in Table 6 below.

Elastollan® 1100 series of products are polyether-based thermoplastic polyurethanes. They exhibit excellent low temperature properties, hydrolysis resistance and fungus resistance. These products can be injection and blow molded and extruded.

BASF indicates that Elastollan® 1175AW, 80A, 90A and 95A are suitable for extrusion. And, Elastollan® 1175AW to 1174D are suitable for injection molding. BASF further provides that a grade should be dried before processing. Elastollan® can be stored for up to 1 year in its original sealed container. Containers should be stored in a cool, dry area. Elastollan® polyurethanes from BASF are commercial TPU's but will not crosslink using irradiation unless a particular reactive co-agent such as Liquiflex™ H, described below, is added. Nearly any other commercially available TPU such as Urepan®, Pellethane®, Morthane®, Desmopan®, etc. can be used provided it is compounded with a co-agent that readily crosslinks, such as with radiation.

Liquiflex™ is a commercially available hydroxyl terminated polybutadiene (HTPB), from Petroflex. It is believed that this co-agent enables the thermoplastic polyurethane to crosslink upon exposure to radiation. It is believed that the previously noted thermoplastic polyurethane EBXL-TPU from Zylon contains a co-agent similar to Liquiflex™.

As indicated above, numerous ways are known to induce crosslinking in a polymer by free radical initiation, including peroxide initiation and irradiation. The golf ball covers of the present invention preferably are crosslinked by irradiation, and more preferably by light rays such as gamma or UV irradiation. Furthermore, other forms of particle irradiation, including electron beam also can be used. Gamma radiation is preferred as golf balls or game balls can be irradiated in bulk. Gamma penetrates very deep but also increases crosslinking of the inner core, and the compression of the core has to be adjusted to allow for the increase in hardness.

Electron beam techniques are faster but cannot be used for treating in bulk as the electron beam does not penetrate very deep and the product needs to be rotated to obtain an even crosslink density.

TABLE 6

| Physical properties[1] | Units | ASTM Method | 1175AW[3] | 1180A | 1185A | 1190A | 1195A | 1154D | 1160D | 1164D | 1174D |
|---|---|---|---|---|---|---|---|---|---|---|---|
| Specific gravity | gr/cc | D-792 | 1.14 | 1.11 | 1.12 | 1.13 | 1.14 | 1.16 | 1.17 | 1.18 | 1.19 |
| Hardness | Shore A | D-224 | 76 ± 2 | 80 ± 2 | 86 ± 2 | 91 ± 2 | 95 ± 2 | — | — | — | — |
| | D | | — | — | — | 42 ± 2 | 47 ± 2 | 53 ± 2 | 60 ± 2 | 64 ± 2 | 73 ± 2 |
| Tensile strength | MPa | D-412 | 30 | 32 | 33 | 37 | 36 | 40 | 40 | 41 | 45 |
| | psi | | 4500 | 4700 | 4800 | 5300 | 5200 | 5800 | 5800 | 6000 | 6500 |
| Tensile stress | | D-412 | | | | | | | | | |
| @ 100% elongation | MPa | | 4.3 | 5.5 | 7.6 | 10 | 12 | 20 | 22 | 25 | 32 |
| | psi | | 620 | 800 | 1100 | 1500 | 1750 | 2900 | 3200 | 3600 | 4600 |
| @ 300% elongation | MPa | | 8.3 | 10 | 12 | 17 | 21 | 30 | 33 | 33 | 38 |
| | psi | | 1180 | 1500 | 1750 | 2500 | 3000 | 4300 | 4800 | 4800 | 5500 |
| Elongation @ brk. | % | D-412 | 740 | 600 | 640 | 575 | 490 | 460 | 415 | 425 | 350 |
| Tensile set @ brk. | % | D-412 | — | 45 | 70 | 75 | 65 | 70 | 60 | 90 | 80 |
| Tear strength | kN/m | D-624 | 80 | 90 | 105 | 125 | 140 | 180 | 205 | 220 | 255 |
| | pli | DIE C | 460 | 515 | 600 | 715 | 800 | 1025 | 1170 | 1250 | 1450 |
| Abrasion resistance | mg (loss) | D-1044[2] (Taber) | | 25 | 30 | 45 | 55 | 75 | 50 | 55 | 75 |

NOTE:
[1]Test samples were cured 20 hours @ 100° C. before testing.
[2]H-18 wheel, 1000 gm weight and 1000 cycles.
[3]Contains proprietary plasticizer.

The type of irradiation to be used will depend in part upon the underlying layers. For example, certain types of irradiation may degrade windings in a wound golf ball. On the other hand, balls with a solid core would not be subject to the same concerns. However, with any type of core, certain types of irradiation will tend to crosslink and thus harden the core. Depending upon whether this type of effect is sought or is to be avoided, the appropriate type of irradiation can be selected.

The level of radiation employed depends upon the desired end characteristics of the final ball cover. However, generally a wide range of dosage levels may be used. For example, total dosages of up to about 12.5, or even 15 Mrads may be employed. Preferably, radiation delivery levels are controlled so that the game ball is not heated above about 80° C. (176° F.) while being crosslinked.

Moreover, in alternative embodiments, the outer cover layer formulation may also comprise a soft, low modulus non-ionomeric thermoplastic elastomer including a polyester polyurethane such as B.F.Goodrich Company's Estane® polyester polyurethane X-4517. According to B.F.Goodrich, Estane® X-4517 has the following properties set forth in Table 7:

TABLE 7

| Properties of Estane ® X-4517 | |
| --- | --- |
| Tensile | 1430 |
| 100% | 815 |
| 200% | 1024 |
| 300% | 1193 |
| Elongation | 641 |
| Youngs Modulus | 1826 |
| Hardness A/D | 88/39 |
| Dayshore Rebound | 59 |
| Solubility in Water | Insoluble |
| Melt processing temperature | >350° F. (>177° C.) |
| Specific Gravity (H$_2$O = 1) | 1.1–1.3 |

Other soft, relatively low modulus non-ionomeric thermoplastic elastomers may also be utilized to produce the outer cover layer as long as the non-ionomeric thermoplastic elastomers produce the playability and durability characteristics desired without adversely effecting the enhanced characteristics produced by the low acid ionomer resin composition. These include, but are not limited to thermoplastic polyurethanes such as: Texin® thermoplastic polyurethanes from Mobay Chemical Co. and the Pellethane® thermoplastic polyurethanes from Dow Chemical Co.; Ionomer/rubber blends such as those in Spalding U.S. Pat. Nos. 4,986,545; 5,098,105 and 5,187,013; and, Hytrel® polyester elastomers from DuPont and Pebax® polyetheramides from Elf Atochem S.A.

Similarly, a castable, thermosetting polyurethane produced by BASF under the trade designation Baytec® has also shown enhanced cover formulation properties. According to BASF, Baytec® (such as Baytec® RE 832), relates to a group of reactive elastomers having outstanding wear resistance, high mechanical strength, high elasticity and good resistance to weathering, moisture and chemicals. The Baytec® RE-832 system gives the following typical physical properties set forth in Table 8:

TABLE 8

| ASTM Test | | | |
| --- | --- | --- | --- |
| Property | Method | Unit | Value |
| Tear Strength | D624 | psi | 180 |
| Stress at | | | |
| 100% Modulus | D412 | psi | 320 |
| 200% Modulus | | | 460 |
| 300% Modulus | | | 600 |
| Ultimate Strength | D412 | psi | 900 |
| Elongation at Break | D412 | % | 490 |
| Taber Abrasion | D460, H-18 | mg/1000 cycles | 350 |

| Component[1] Properties | Part A (Isocyanate) | Part B (Resin) |
| --- | --- | --- |
| Viscosity @ 25° C., mPa · s | 2500 | 2100 |
| Density @ 25° C., g/cm | 1.08 | 1.09 |
| NCO, % | 9.80 | — |
| Hydroxyl Number, Mg KOH/g | — | 88 |

[1]Component A is a modified diphenylmethane diisocyanate (MDI) prepolymer and component B is a polyether polyol blend.

Filler Materials

The present invention golf balls may also include a wide array of filler materials. Such materials may be incorporated in any of the components of the golf ball, such as any part of the core or core assembly, inner cover layer, or outer cover layer.

Examples of various suitable heavy filler materials which can be included in the present invention are set forth in Table 9 as follows:

TABLE 9

| | Spec. Gravity |
| --- | --- |
| Filler Type | |
| graphite fibers | 1.5–1.8 |
| precipitated hydrated silica | 2.0 |
| clay | 2.62 |
| talc | 2.85 |
| asbestos | 2.5 |
| glass fibers | 2.55 |
| aramid fibers (Kevlar ®) | 1.44 |
| mica | 2.8 |
| calcium metasilicate | 2.9 |
| barium sulfate | 4.6 |
| zinc sulfide | 4.1 |
| silicates | 2.1 |
| diatomaceous earth | 2.3 |
| calcium carbonate | 2.71 |
| magnesium carbonate | 2.20 |
| Metals and Alloys (powders) | |
| titanium | 4.51 |
| tungsten | 19.35 |
| aluminum | 2.70 |
| bismuth | 9.78 |
| nickel | 8.90 |
| molybdenum | 10.2 |
| iron | 7.86 |
| copper | 8.94 |
| brass | 8.2–8.4 |
| boron | 2.364 |
| bronze | 8.70–8.74 |
| cobalt | 8.92 |

TABLE 9-continued

|  | Spec. Gravity |
|---|---|
| beryllium | 1.84 |
| zinc | 7.14 |
| tin | 7.31 |
| Metal Oxides | |
| zinc oxide | 5.57 |
| iron oxide | 5.1 |
| aluminum oxide | 4.0 |
| titanium dioxide | 3.9–4.1 |
| magnesium oxide | 3.3–3.5 |
| zirconium oxide | 5.73 |
| Metal Stearates | |
| zinc stearate | 1.09 |
| calcium stearate | 1.03 |
| barium stearate | 1.23 |
| lithium stearate | 1.01 |
| magnesium stearate | 1.03 |
| Particulate carbonaceous materials | |
| graphite | 1.5–1.8 |
| carbon black | 1.8 |
| natural bitumen | 1.2–1.4 |
| cotton flock | 1.3–1.4 |
| cellulose flock | 1.15–1.5 |
| leather fiber | 1.2–1.4 |

The amount and type of heavy weight filler material utilized is dependent upon the overall characteristics of the multi-layered golf ball desired. Generally, lesser amounts of high specific gravity materials are necessary to produce an increase in the moment of inertia in comparison to low specific gravity materials. Furthermore, handling and processing conditions can also affect the type of heavy weight filler material incorporated into cover layers. In this regard, Applicant has found that the inclusion of approximately 10 phr brass powder into an inner cover layer produces an increase in the rotational moment of inertia without involving substantial processing changes. Thus, 10 phr brass powder is generally the most preferred heavy filler material for increasing the noted moment of inertia of a ball.

Multi-Layer Core Assembly

The core of the preferred embodiment golf balls described herein can be formed of an inner or central core component and a solid outer core layer having a particular and desired COR, compression and hardness. An example of such a ball is illustrated in FIG. 2. For balls having a low moment of inertia, the central core layer has a higher specific gravity than the outer core layer. In a preferred embodiment, the core component may comprise one or more metals. Layers or regions disposed around the central core component are generally referred to as core layers herein. However, the term "mantle" may also be used to refer to a layer surrounding a core or core component.

The preferred central core components of the present invention golf balls are relatively soft and exhibit a PGA compression of about 80 to 85.

The preferred core layers of the golf ball of the present invention generally are more resilient than that of the cover layers, exhibiting a PGA compression of about 95 or less, preferably about 30 to 85, and more preferably about 40 to 60.

The core compositions and resulting molded cores of the present invention are manufactured using relatively conventional techniques. In this regard, the core compositions of the invention preferably are based on a variety of materials, particularly the conventional rubber based materials such as cis-1,4 polybutadiene and mixtures of polybutadiene with other elastomers blended together with crosslinking agents, a free radical initiator, specific gravity controlling fillers and the like. Natural rubber, isoprene rubber, EPR, EPDM, styrene-butadiene rubber, or similar thermoset materials may be appropriately incorporated into the base rubber composition of the butadiene rubber to form the rubber component. It is preferred to use butadiene rubber as a base material of the composition for both the central core layer and the outer core layer. Thus, the same rubber composition, including the rubber base, crosslinking agent, free radical initiator, and modifying ingredients, except for the specific gravity controlling filler, can be used in both the central and outer core layers. However, different compositions can readily be used in the different layers, including thermoplastic materials such as a thermoplastic elastomer or a thermoplastic rubber, or a thermoset rubber or thermoset elastomer material. Some examples of materials suitable for use as a core layer include polyether or polyester thermoplastic urethanes as well as thermoset polyurethanes or metallocene polymers or blends thereof. For example, suitable metallocene polymers include foams of thermoplastic elastomers based on metallocene single site catalyst based foams. Such metallocene based foam resins are commercially available. A thermoset material is a rubber based, castable urethane or a silicone rubber. The silicone elastomer may be any thermoset or thermoplastic polymer comprising, at least partially, a silicone backbone. Preferably, the polymer is a thermoset and is produced by intermolecular condensation of silanols. A typical example is a polydimethylsiloxane crosslinked by free radical initiators, or by the crosslinking of vinyl or allyl groups attached to the silicone through reaction with silyhydride groups, or via reactive end groups. The silicone may include a reinforcing or non-reinforcing filler. Additionally, the present invention also contemplates the use of a polymeric foam material, such as a metallocene based foamed resin.

It is preferred that the base rubber or elastomer have a relatively high molecular weight. The broad range for the molecular weight of suitable base elastomers is from about 50,000 to about 500,000. A more preferred range for the molecular weight of the base elastomer is from about 100,000 to about 500,000. As a base elastomer for the core composition, cis-polybutadiene is preferably employed, or a blend of cis-polybutadiene with other elastomers may also be utilized.

The crosslinking agent of the core composition is the reaction product of an unsaturated carboxylic acid or acids and an oxide or carbonate of a metal such as zinc, magnesium, barium, calcium, lithium, sodium, potassium, cadmium, lead, tin, and the like. Preferably, the oxides of polyvalent metals such as zinc, magnesium and cadmium are used, and most preferably, the oxide is zinc oxide.

Exemplary of the unsaturated carboxylic acids which find utility in the present core compositions are the α- or β-ethylenic unsaturated acids such as acrylic acid, methacrylic acid, itaconic acid, crotonic acid, sorbic acid, and the like, and mixtures thereof. Preferably, the acid component is either acrylic or methacrylic acid. Usually, from about 15 to about 30, and preferably from about 17 to about 23 parts by weight of the carboxylic acid salt, such as zinc diacrylate, is included in the core composition. The unsaturated carboxylic acids and metal salts thereof are generally soluble in the elastomeric base, or are readily dispersible.

The free radical initiator included in the core composition is any known polymerization initiator which decomposes during the cure cycle. The term "free radical initiator" as used herein refers to a chemical which, when added to a mixture of the elastomeric blend and a metal salt of an unsaturated, carboxylic acid, promotes crosslinking of the elastomers by the metal salt of the unsaturated carboxylic acid. The amount of the selected initiator present is dictated only by the requirements of catalytic activity as a polymerization initiator. Suitable initiators include peroxides, persulfates, azo compounds and hydrazides. Peroxides which are readily commercially available are conveniently used in the present invention, generally in amounts of from about 0.1 to about 10.0, and preferably in amounts of from about 0.3 to about 3.0 parts by weight per each 100 parts of elastomer.

Exemplary of suitable peroxides for the purposes of the present invention are dicumyl peroxide, n-butyl 4,4'-bis (butylperoxy) valerate, 1,1-bis(t-butylperoxy)-3,3,5-trimethyl cyclohexane, di-t-butyl peroxide and 2,5-di-(t-butylperoxy)-2,5 dimethyl hexane and the like, as well as mixtures thereof. It will be understood that the total amount of initiators used will vary depending on the specific end product desired and the particular initiators employed. Commercially available peroxides include n-butyl 4,4-bis (butylperoxy) valerate having a one hour half life at about 112° C., and 1,1-bis(t-butylperoxy)-3,3,5-trimethyl cyclohexane having a one hour half life at about 129° C.

The core compositions of the present invention may additionally contain any other suitable and compatible modifying ingredients including, but not limited to, metal oxides, fatty acids, and diisocyanates and polypropylene powder resins. For example, a polymeric diisocyanate is used as an optional component in the rubber compositions. It can range from about 0 to 5 parts by weight per 100 parts by weight rubber (phr) component, and acts as a moisture scavenger.

Various activators may also be included in the compositions of the present invention. For example, zinc oxide and/or magnesium oxide are activators for the polybutadiene. The activator can range from about 2 to about 30 parts by weight per 100 parts by weight of the rubbers (phr) component.

Moreover, filler-reinforcement agents may be added to the compositions of the present invention. Additional benefits may be obtained by the incorporation of relatively large amounts of higher specific gravity, inexpensive mineral fillers such as calcium carbonate, tungsten, tungsten carbide, barium sulfate, and zinc sulfate. However, the filler is not limited to these substances. Such fillers as are incorporated into the core compositions should be in finely divided form, as for example, in a size generally less than about 30 mesh and preferably less than about 100 mesh U.S. standard size. The amount of additional filler included in the core composition is primarily dictated by weight restrictions and preferably is included in amounts of from about 3 to about 300 parts by weight and more preferably in amounts from about 20 to about 200 parts by weight per 100 parts rubber.

The preferred fillers are relatively inexpensive and heavy and serve to lower the cost of the ball and to increase the weight of the ball to closely approach the U.S.G.A. weight limit of 1.620 ounces. However, if thicker cover compositions are to be applied to the core to produce larger than normal (i.e. greater than 1.680 inches in diameter) balls, use of such fillers and modifying agents will be limited in order to meet the U.S.G.A. maximum weight limitations of 1.620 ounces. Exemplary fillers include mineral fillers such as zinc oxide, limestone, silica, mica, barytes, lithopone, zinc sulphide, talc, calcium carbonate, clays, powdered metals and alloys such as bismuth, brass, bronze, cobalt, copper, iron, nickel, tungsten, aluminum, tin, etc. Limestone is ground calcium/magnesium carbonate and is used because it is an inexpensive, heavy filler.

Since the specific gravity of the inner core is required to be adjusted upwardly relative to the specific gravity of the outer core so as to provide a low moment of inertia ball and at the same time set the total weight of the entire core in a specific range, the amount of the filler can vary widely.

Fatty acids or metallic salts of fatty acids may also be included in the core compositions, functioning to improve moldability and processing and increase the activity of the cure rate resulting in higher C.O.R. Generally, free fatty acids having from about 10 to about 40 carbon atoms, and preferably having from about 15 to about 20 carbon atoms, are used. Exemplary of suitable fatty acids are stearic acid, linoleic acid, and palmitic acid, as well as mixtures thereof. Exemplary of suitable metallic salts of fatty acids include zinc stearate. When included in the core compositions, the fatty acid components are present in amounts of from about 1 to about 25, and preferably in amounts from about 2 to about 15 parts by weight based on 100 parts rubber (elastomer).

It is preferred that the core compositions include stearic acid as the fatty acid adjunct in an amount of from about 2 to about 18 parts by weight per 100 parts of rubber. Fatty acids are used when metallic salts of fatty acids are not included in the core formulation.

Diisocyanates may also be optionally included in the core compositions. When utilized, the diiosyanates are included in amounts of from about 0.2 to about 5.0 parts by weight based on 100 parts rubber. Exemplary of suitable diisocyanates is 4,4'-diphenylmethane diiosyanate and other polyfunctional isocyanates known to the art.

Furthermore, the dialkyl tin difatty acids set forth in U.S. Pat. No. 4,844,471, the dispersing agents disclosed in U.S. Pat. No. 4,838,556, and the dithiocarbamates set forth in U.S. Pat. No. 4,852,884 may also be incorporated into the polybutadiene compositions of the present invention. The specific types and amounts of such additives are set forth in the above identified patents, which are incorporated herein by reference.

The core compositions of the invention are generally comprised of 100 parts by weight of a base elastomer (or rubber) selected from polybutadiene and mixtures of polybutadiene with other elastomers, about 2 to 50 and preferably 5 to 25 parts by weight of at least one metallic salt of an unsaturated carboxylic acid, and 0.5 to 10 and preferably 1 to 5 parts by weight of a free radical initiator.

As indicated above, additional suitable and compatible modifying agents such as fatty acids, and secondary additives such as Pecan shell flour, ground flash (i.e. grindings from previously manufactured cores of substantially identical construction), barium sulfate, zinc oxide, powdered metals, etc. may be added to the core compositions to adjust the finished weight of the ball as necessary in order to have the finished molded ball (core, cover and coatings) closely approach the U.S.G.A. weight limit of 1.620 ounces.

As will be appreciated, the specific gravity controlling filler may be added to only the outer core layer where a higher specific gravity is required in that layer relative to the central core layer. In most instances, the difference in specific gravity between the core layers should be greater than 0.1 and preferably at least about 0.2 or more, i.e. up to about 18.5, with the higher differentials being provided in those balls having the higher specific gravity in the center core layer. The specific gravity of the center core may vary from about 1.0 to about 20 while the specific gravity of the outer core layer varies from about 0.9 to about 1.6. The preferred range of specific gravity for the center core is between about 1.5 and 20 when a very low moment of inertia is desired and the center core has a higher specific gravity than the outer core layer. In that instance the outer core layer has a specific gravity in the range of about 0.8 to 1.2. Conversely, when the outer core layer has the higher specific gravity, the preferred range of specific gravity for the outer core layer is between about 1.2 and 1.6, and that of the center core is about 1.0to 1.2.

The outer diameter of the center core and the outer diameter of the outer core (core diameter) may vary. However, the center core has a diameter of about 3 to 20 mm and preferably about 3 to 15 mm while the outer core has a diameter of about 30 to 40 mm and preferably 35 to 38 mm, depending on the size of the center core and the finished size of the ball. Typically the center core diameter is about 3 to 12 mm.

The core having a two-layer structure composed of the inner core and the outer core is referred to as the solid core in the present invention. The above expression is in contrast to a thread-wound core (core formed by winding a rubber thread around the center portion which is solid or filled with a liquid material). However, as is apparent from the fact that a foamed material may be used as the outer core layer, the core is not always required to be solid.

The double cores of the inventive golf balls typically have a coefficient of restitution of about 0.730 or more, and more preferably 0.770 or more. The double cores have a weight of 25 to 40 grams and preferably 30 to 40 grams and a Shore C hardness of less than 80, with the preferred Shore C hardness being about 50 to 75. Generally, 5 parts of zinc oxide are used to activate the cure system of the core compound. Amounts larger than 5 parts of zinc oxide are used to increase the core weight so that the finished ball more closely approaches the upper limit of 1.620 ounces.

The present invention includes golf ball embodiments that utilize three or more core components. For example, in accordance with the present invention, a core assembly is provided that comprises a central core component and two or more core layers disposed about the central core component.

Methods of Forming Golf Balls

In producing golf ball cores utilizing the present compositions, the ingredients may be intimately mixed using, for example, two roll mills or a Banbury® mixer until the composition is uniform, usually over a period of from about 5 to about 20 minutes. The sequence of addition of the components is not critical. A preferred blending sequence is as follows.

The elastomer, crosslinking agent, fillers, zinc salt, metal oxide, fatty acid, and the metallic dithiocarbamate (if desired), surfactant (if desired), and tin difatty acid (if desired), are blended for about 7 minutes in an internal mixer such as a Banbury® mixer. As a result of shear during mixing, the temperature rises to about 200° F. The mixing is desirably conducted in such a manner that the composition does not reach incipient polymerization temperatures during the blending of the various components. The initiator and diisocyanate are then added and the mixing continued until the temperature reaches about 220° F. whereupon the batch is discharged onto a two roll mill, mixed for about one minute and sheeted out.

The sheet is rolled into a "pig" and then placed in a Barwell® preformer and slugs of the desired weight are produced. The slugs to be used for the center core layer are then subjected to compression molding at about 130° C. to about 180° C. for about 10 to 50 minutes. Note that the temperature in the molding process is not always required to be constant, and may be changed in two or more steps. In fact, the slugs or preforms for the outer core layer are frequently preheated for about one half hour at about 75° C. prior to molding.

The outer core layer is usually formed by placing a rubber composition preform mass, sheet or shell for the production of the outer core in the top and bottom hemispheres of a mold with a center core mold form therebetween and then press-molding. The resultant hemispheres are combined with the preformed center core and cured. The curing conditions in the press-molding process can be the same as in producing the center core.

The above-mentioned arrangement may vary considerably, and therefore a method of forming a half shell and adhering the same can be adopted, as well as an injection or transfer molding method.

After molding, the molded multilayer cores are cooled, the cooling effected at room temperature for about 4 hours or in cold water for about one hour. The molded cores are subjected to a centerless grinding operation whereby a thin layer of the molded core is removed to produce a round core having a diameter of about 1.470 to 1.570 inches. Alternatively, the cores are used in the as-molded state with no grinding needed to achieve roundness.

Usually the curable component of the composition will be cured by heating the composition at elevated temperatures on the order of from about 275° F. to about 350° F., preferably and usually from about 290° F. to about 325° F., with molding of the composition effected simultaneously with the curing thereof. The composition can be formed into a core structure by any one of a variety of molding techniques, e.g., injection, compression, or transfer molding. When the composition is cured by heating, the time required for heating will normally be short, generally from about 2 to about 20 minutes, depending upon the particular curing agent used and method of molding. Those of ordinary skill in the art relating to free radical curing agents for polymers are conversant with adjustments of cure times and temperatures required to effect optimum results with any specific free radical agent.

After molding, the core is removed from the mold and the surface thereof preferably is treated to facilitate adhesion thereof to the covering materials. Surface treatment can be effected by any of the several techniques known in the art, such as corona discharge, ozone treatment, sand blasting, brush tumbling, and the like. Preferably, surface treatment is effected by grinding with an abrasive wheel. The weight of the inner core is adjusted so that the total weight of the center core and the outer core layer falls within a range of 30 to 38 g.

In a particularly preferred aspect, the center core component of the cores utilized in the present invention golf balls comprises one or more metals. Nearly any high density metal is suitable such as steel, brass, lead, tungsten, molybdenum, nickel, copper, or combinations thereof. Preferably, the center core components are formed from steel, brass, lead, tungsten, and combinations thereof and are spherical in shape. Examples of suitable steels include for example, carbon steel, stainless steel, and chrome steel. The metals may be in many forms such as particulate, shavings, or a solid, relatively homogenous spherical form. In this latter aspect, the center core component has a significantly smaller diameter than previously described, i.e. 3 to 20 mm. In this aspect, the diameters generally range from about 3 mm to about 15 mm, with a preferred range being from about 7.8 mm to about 9.8 mm. This preferred range encompasses diameters of ⅜ inches, ¹¹⁄₃₂ inches, and ⁵⁄₁₆ inches.

Although it is preferred to utilize a multi-layer core as described herein, the present invention golf balls may utilize conventional cores. A conventional solid core is about 1.545 inches in diameter, although it can range from about 1.495 to about 1.575 inches. Conventional solid cores are typically compression molded from a slug of uncured or lightly cured elastomer composition comprising a high cis content polybutadiene and a metal salt of an α, β, ethylenically unsaturated carboxylic acid such as zinc mono or diacrylate or methacrylate. To achieve higher coefficients of restitution in the core, the manufacturer may include fillers such as small amounts of a metal oxide such as zinc oxide. In addition, larger amounts of metal oxide than those that are needed to achieve the desired coefficient are often included in conventional cores in order to increase the core weight so that the finished ball more closely approaches the U.S.G.A. upper weight limit of 1.620 ounces. Other materials may be used in the core composition including compatible rubbers or ionomers, and low molecular weight fatty acids such as stearic acid. Free radical initiators such as peroxides are admixed with the core composition so that on the application of heat and pressure, a complex curing cross-linking reaction takes place.

In preparing golf balls in accordance with the present invention, a hard inner cover layer is molded (by injection molding or by compression molding) about a core (preferably a solid core). A comparatively softer outer layer is molded over the inner layer.

Additional materials may be added to the cover compositions (both inner and outer cover layer) of the present invention including dyes (for example, Ultramarine Blue™ sold by Whitaker, Clark and Daniels of South Plainsfield, N.J.) (see U.S. Pat. No. 4,679,795); pigments such as titanium dioxide, zinc oxide, barium sulfate and zinc sulfate; and UV absorbers; antioxidants; antistatic agents; and stabilizers. Further, the cover compositions of the present invention may also contain softening agents, such as plasticizers, processing aids, etc. and reinforcing material such as glass fibers and inorganic fillers, as long as the desired properties produced by the golf ball covers are not impaired.

The various cover composition layers of the present invention may be produced according to conventional melt blending procedures. In the case of the outer cover layer, when a blend of hard and soft, low acid ionomer resins are utilized, the hard ionomer resins are blended with the soft ionomeric resins and with a masterbatch containing the desired additives in a Banbury® mixer, two-roll mill, or extruder prior to molding. The blended composition is then formed into slabs and maintained in such a state until molding is desired. Alternatively, a simple dry blend of the pelletized or granulated resins and color masterbatch may be prepared and fed directly into the injection molding machine where homogenization occurs in the mixing section of the barrel prior to injection into the mold. If necessary, further additives such as an inorganic filler, etc., may be added and uniformly mixed before initiation of the molding process. A similar process is utilized to formulate the high acid ionomer resin compositions used to produce the inner cover layer.

The golf balls of the present invention can be produced by molding processes currently well known in the golf ball art. Specifically, the golf balls can be produced by injection molding or compression molding the inner cover layer about wound or solid molded cores to produce an intermediate golf ball having a diameter of about 1.50 to 1.67 inches, preferably about 1.620 inches. The outer layer is subsequently molded over the inner layer to produce a golf ball having a diameter of 1.680 inches or more. Although either solid cores or wound cores can be used in the present invention, as a result of their lower cost and superior performance, solid molded cores are preferred over wound cores.

In compression molding, the inner cover composition is formed via injection at about 380° F. to about 450° F. into smooth surfaced hemispherical shells which are then positioned around the core in a mold having the desired inner cover thickness and subjected to compression molding at 200° F. to 300° F. for about 2 to 10 minutes, followed by cooling at 50° to 70° F. for about 2 to 7 minutes to fuse the shells together to form a unitary intermediate ball. In addition, the intermediate balls may be produced by injection molding wherein the inner cover layer is injected directly around the core placed at the center of an intermediate ball mold for a period of time in a mold temperature of from 50° F. to about 100° F. Subsequently, the outer cover layer is molded about the core and the inner layer by similar compression or injection molding techniques to form a dimpled golf ball of a diameter of 1.680 inches or more.

The preferred method of forming a fast-chemical-reaction-produced component for a golf ball according to the invention is by reaction injection molding (RIM). RIM is a process by which highly reactive liquids are injected into a closed mold, mixed usually by impingement and/or mechanical mixing in an in-line device such as a "peanut mixer", where they polymerize primarily in the mold to form a coherent, one-piece molded article. The RIM processes usually involve a rapid reaction between one or more reactive components such as polyether—or polyester—polyol, polyamine, or other material with an active hydrogen, and one or more isocyanate—containing constituents, often in the presence of a catalyst. The constituents are stored in separate tanks prior to molding and may be first mixed in a mix head upstream of a mold and then injected into the mold. The liquid streams are metered in the desired weight to weight ratio and fed into an impingement mix head, with mixing occurring under high pressure, e.g., 1500 to 3000 psi. The liquid streams impinge upon each other in the mixing chamber of the mix head and the mixture is injected into the mold. One of the liquid streams typically contains a catalyst for the reaction. The constituents react rapidly after mixing to gel and form polyurethane polymers. Polyureas, epoxies, and various unsaturated polyesters also can be molded by RIM.

RIM differs from non-reaction injection molding in a number of ways. The main distinction is that in RIM a chemical reaction takes place in the mold to transform a monomer or adducts to polymers and the components are in liquid form. Thus, a RIM mold need not be made to withstand the pressures which occur in a conventional injection molding. In contrast, injection molding is conducted at high molding pressures in the mold cavity by melting a solid resin and conveying it into a mold, with the molten resin often being at about 150° C. to about 350° C. At this elevated temperature, the viscosity of the molten resin usually is in the range of 50,000 to about 1,000,000 centipoise, and is typically around 200,000 centipoise. In an injection molding process, the solidification of the resins occurs after about 10 to about 90 seconds, depending upon the size of the molded product, the temperature and heat transfer conditions, and the hardness of the injection molded material. Subsequently, the molded product is removed from the mold. There is no significant chemical reaction taking place in an injection molding process when the thermoplastic resin is introduced into the mold. In contrast, in a RIM process, the chemical reaction causes the material to set, typically in less than about 5 minutes, often in less than 2 minutes, preferably less than 1 minute, more preferably in less than 30 seconds, and in many cases in about 10 seconds or less.

If plastic products are produced by combining components that are preformed to some extent, subsequent failure can occur at a location on the cover which is along the seam or parting line of the mold. Failure can occur at this location because this interfacial region is intrinsically different from the remainder of the cover layer and can be weaker or more stressed. The present invention is believed to provide for improved durability of a golf ball cover layer by providing a uniform or "seamless" cover in which the properties of the cover material in the region along the parting line are generally the same as the properties of the cover material at other locations on the cover, including at the poles. The improvement in durability is believed to be a result of the fact that the reaction mixture is distributed uniformly into a closed mold. This uniform distribution of the injected materials reduces or eliminates knit-lines and other molding deficiencies which can be caused by temperature difference and/or reaction difference in the injected materials. The process of the invention results in generally uniform molecular structure, density and stress distribution as compared to conventional injection-molding processes.

In several embodiments, the fast-chemical-reaction-produced component has a flex modulus of 1 to 310 kpsi, more preferably 5 to 100 kpsi, and most preferably 5 to 80 kpsi. The subject component can be a cover with a flex modulus which is higher than that of the centermost component of the cores, as in a liquid center core and some solid center cores. Furthermore, the fast-chemical-reaction-produced component can be a cover with a flex modulus that is higher than that of the immediately underlying layer, as in the case of a wound core. The core can be one piece or multi-layer, each layer can be either foamed or unfoamed, and density adjusting fillers, including metals, can be used. The cover of the ball can be harder or softer than any particular core layer.

The fast-chemical-reaction-produced component can incorporate suitable additives and/or fillers. When the component is an outer cover layer, pigments or dyes, accelerators and UV stabilizers can be added. Examples of suitable optical brighteners which probably can be used include Uvitex® and Eastobrite® OB-1. An example of a suitable white pigment is titanium dioxide. Examples of suitable and UV light stabilizers are provided in commonly assigned U.S. Pat. No. 5,494,291, herein incorporated by reference. Fillers which can be incorporated into the fast-chemical-reaction-produced cover or core component include those listed herein. Furthermore, compatible polymeric materials can be added. For example, when the component comprises polyurethane and/or polyurea, such polymeric materials include polyurethane ionomers, polyamides, etc.

One of the significant advantages of the RIM process according to the invention is that polyurethane or other cover materials can be recycled and used in golf ball cores. Recycling can be conducted by, e.g., glycolysis. Typically, 10 to 90% of the material which is injection molded actually becomes part of the cover. The remaining 10 to 90% is recycled.

Recycling of polyurethanes by glycolysis is known from, for example, RIM Part and Mold Design—Polyurethanes, 1995, Bayer Corp., Pittsburgh, Pa. Another significant advantage of the present invention is that because reaction injection molding occurs at low temperatures and pressures, i.e., 90 to 180° F. and 50 to 200 psi, this process is particularly beneficial when a cover is to be molded over a very soft core. When higher pressures are used for molding over soft cores, the cores "shut off" i.e., deform and impede the flow of material causing uneven distribution of cover material.

Non-limiting examples of suitable RIM systems for use in the present invention are Bayflex® elastomeric polyurethane RIM systems, Baydur® GS solid polyurethane RIM systems, Prism® solid polyurethane RIM systems, all from Bayer Corp. (Pittsburgh, Pa.), Spectrim® reaction moldable polyurethane and polyurea systems from Dow Chemical USA (Midland, Mich.), including Spectrim® MM 373-A (isocyanate) and 373-B (polyol), and Elastolit® SR systems from BASF (Parsippany, N.J.). Preferred RIM systems include Bayflex® MP-10000 and Bayflex® 110-50, filled and unfilled. Further preferred examples are polyols, polyamines and isocyanates formed by processes for recycling polyurethanes and polyureas.

After molding, the golf balls produced may undergo various further processing steps such as buffing, painting and marking as disclosed in U.S. Pat. No. 4,911,451.

The resulting golf ball produced from the low acid ionomer resin inner layer and the relatively softer, low flexural modulus outer layer provide for an improved multi-layer golf ball which provides for desirable coefficient of restitution, compression, spin and durability properties while at the same time offering the feel and spin characteristics associated with soft balata and balata-like covers of the prior art.

The present invention is further illustrated by the following examples in which the parts of the specific ingredients are by weight. It is to be understood that the present invention is not limited to the examples, and various changes and modifications may be made in the invention without departing from the spirit and scope thereof.

EXAMPLE 1

Several intermediate balls (cores plus inner cover layers) were prepared in accordance with conventional molding procedures described above. The inner cover compositions were molded around 1.545 inch diameter cores weighing 36.5 grams such that the inner cover had a wall thickness of about 0.0675 inches, with the overall ball measuring about 1.680 inches in diameter.

The cores utilized in the examples were comprised of the following ingredients: high cis-polybutadiene, zinc diacrylate, zinc oxide, zinc stearate, peroxide, calcium carbonate, etc. The molded cores exhibited Riehle compressions of about 60 and C.O.R. values of about 0.800. Details for measuring compression are set forth in U.S. Pat. No. 5,984,806 incorporated herein by reference. A representative formulation of the molded cores is set forth below in Table 10:

TABLE 10

| MATERIAL | WEIGHT |
|---|---|
| BR-1220 (high cis-polybutadiene) | 70.70 |
| Taktene ® 220 (high cis-polybutadiene) | 29.30 |
| React Rite ™ ZDA (zinc diacrylate) | 31.14 |
| Zinc Oxide | 6.23 |
| Zinc Stearate | 20.15 |
| Limestone | 17.58 |
| Ground Flash (20–40 Mesh) | 20.15 |
| Blue Masterbatch | .012 |
| Luperco ® 231XL or Trigonox ® 29/40 | .89 |
| Papi ® 94 | .50 |

[1]Blue Masterbatch consists of unknown compositions used only for internal identification purposes and has no effect on physical properties.

The inner cover compositions designated herein as compositions A-E utilized to formulate the intermediate balls are set forth in Table 11 below. The resulting molded intermediate balls were tested to determine the individual compression (Riehle), C.O.R., Shore C hardness, spin rate and cut resistance properties. These results are also set forth in Table 11 below.

The data of these examples are the average of twelve intermediate balls produced for each example. The properties were measured according to the following parameters:

Coefficient of restitution (C.O.R.) was measured by firing the resulting golf ball in an air cannon at a velocity of 125 feet per second against a steel plate. The rebound velocity was then measured. The rebound velocity was divided by the forward velocity to give a coefficient of restitution. Details for this procedure are set forth in U.S. Pat. No. 5,984,806, herein incorporated by reference.

Shore hardness was measured generally in accordance with ASTM test 2240, but measured on a land area of the curved surface of the outer cover layer.

Cut resistance was measured in accordance with the following procedure: A golf ball is fired at 135 feet per second against the leading edge of a pitching wedge wherein the leading edge radius is 1/32 inch, the loft angle is 51 degrees, the sole radius is 2.5 inches and the bounce angle is 7 degrees.

The spin rate of the golf ball was measured by striking the resulting golf balls with a pitching wedge or 9 iron wherein the club head speed is about 105 feet per second and the ball is launched at an angle of 26 to 34 degrees with an initial velocity of about 110 to 115 feet per second. The spin rate was measured by observing the rotation of the ball in flight using stop action Strobe photography.

Initial velocity is the velocity of a ball when struck at a hammer speed of 143.8 feet per second in accordance with a test as prescribed by the U.S.G.A.

As will be noted, compositions A, B and C include high acid ionomeric resins (16% or more acid), with composition B further including zinc stearate. Composition D represents the inner layer (i.e. Surlyn® 1605) used in U.S. Pat. No. 4,431,193. Composition E provides a hard, low acid ionomeric resin blend.

The purpose behind producing and testing the balls of Table 11 was to provide a subsequent comparison in properties with the multi-layer golf balls of the present invention.

TABLE 11

Molded Intermediate Golf Balls

| Ingredients of Inner Cover Compositions | A | B | C | D | E |
|---|---|---|---|---|---|
| Iotek ® 959 | 50 | 50 | — | — | — |
| Iotek ® 960 | 50 | 50 | — | — | — |
| Zinc ® Stearate | — | 50 | — | — | — |
| Surlyn ® 8162 | — | — | 75 | — | — |
| Surlyn ® 8422 | — | — | 25 | — | — |
| Surlyn ® 1605 | — | — | — | 100 | — |
| Iotek ® 7030 | — | — | — | — | 50 |
| Iotek ® 8000 | — | — | — | — | 50 |
| Properties of Molded Intermediate Balls | | | | | |
| Compression | 58 | 58 | 60 | 63 | 62 |
| C.O.R. | .811 | .810 | .807 | .793 | .801 |
| Shore C Hardness | 98 | 98 | 97 | 96 | 96 |
| Spin Rate (R.P.M.) | 7,367 | 6,250 | 7,903 | 8,337 | 7,956 |
| Cut Resistance | 4–5 | 4–5 | 4–5 | 4–5 | 4–5 |

As shown in Table 11 above, the high acid ionomer resin inner cover layer (molded intermediate balls A–C) have lower spin rates and exhibit more favorable characteristics than the low acid ionomer resin based inner cover layers of balls D and E.

Multi-layer balls in accordance with the present invention were then prepared. Specifically, the inner cover compositions used to produce intermediate golf balls from Table 11 were molded over the solid cores to a thickness of about 0.0375 inches, thus forming the inner layer. The diameter of the solid core with the inner layer measured about 1.620 inches. Alternatively, the intermediate golf balls of Table 11 were ground down using a centerless grinding machine to a size of 1.620 inches in diameter to produce an inner cover layer of 0.0375 inches.

The size of 1.620 inches was determined after attempting to mold the outer cover layer to various sizes (1.600", 1.610", 1.620", 1.630" and 1.640") of intermediate (core plus inner layer) balls. It was determined that 1.620" was about the largest "intermediate" ball (i.e., core plus inner layer) which could be easily molded over with the soft outer layer materials of choice. The goal herein was to use as thin an outer layer as necessary to achieve the desired playability characteristics while minimizing the cost of the more expensive outer materials. However, with a larger diameter final golf ball and/or if the cover is compression molded, a thinner cover becomes feasible.

With the above in mind, an outer cover layer composition was blended together in accordance with conventional blending techniques. The outer layer composition used for this portion of the example is a relatively soft cover composition such as those listed in U.S. Pat. No. 5,120,791. An example of such a soft cover composition is a 45% soft/55% hard low acid ionomer blend designated by the inventor as "TE-90". The composition of TE-90 is set forth below in Table 12 as follows:

TABLE 12

Outer Cover Layer Composition TE-90

| | |
|---|---|
| Iotek ® 8000 | 22.7 weight % |
| Iotek ® 7030 | 22.7 weight % |
| Iotek ® 7520 | 45.0 weight % |
| White MB[1] | 9.6 weight % |

[1]White MB consists of about 23.77 weight percent $TiO_2$; 0.22 weight percent Uvitex ® OB, 0.03 weight percent Santonox ® R, 0.05 weight percent Ultramarine Blue ™ and 75.85 weight percent Iotek ® 7030.

The above outer layer composition was molded around each of the 1.620 diameter intermediate balls comprising a core plus one of compositions A–D, respectively. In addition, for comparison purposes, Surlyn® 1855 (new Surlyn® 9020), the cover composition of the '193 patent, was molded about the inner layer of composition D (the intermediate ball representative of the '193 patent). The outer layer TE-90 was molded to a thickness of approximately 0.030 inches to produce a golf ball of approximately 1.680 inches in diameter. The resulting balls (a dozen balls for each example) were tested and the various properties thereof are set forth in Table 13 as follows:

TABLE 13

Finished Balls

| Ingredients: | 1 | 2 | 3 | 4 | 5 |
|---|---|---|---|---|---|
| Inner Cover Composition | A | B | C | D | D |
| Outer Cover Composition | TE-90 | TE-90 | TE-90 | TE-90 | Surlyn ® 9020 |
| Properties of Molded Finished Balls: | | | | | |
| Compression | 63 | 63 | 69 | 70 | 61 |
| C.O.R. | .784 | .778 | .780 | .770 | .757 |
| Shore C Hardness | 88 | 88 | 88 | 88 | 89 |
| Spin (R.P.M.) | 8,825 | 8,854 | 8,814 | 8,990 | 8,846 |
| Cut Resistance | 3–4 | 3–4 | 3–4 | 3–4 | 3–4 |

As it will be noted in finished balls 1–4, by creating a multi-layer cover utilizing the high acid ionomer resins in the inner cover layer and the hard/soft low acid ionomer resin in the outer cover layer, generally higher compression and increased spin rates are noted over the single layer covers of Table 11. In addition, both the C.O.R. and the Shore C hardness are reduced over the respective single layer covers of Table 11. This was once again particularly true with respect to the multi-layered balls containing the high acid ionomer resin in the inner layer (i.e. finished balls 1–4). In addition, with the exception of prior art ball 5 (i.e. the '193 patent), resistance to cutting remains good but is slightly decreased. As noted above, the prior art ball of the '193 patent suffers substantially in durability (as well as in resiliency) in comparison to the balls of the present invention.

Furthermore, it is also noted that the use of the high acid ionomer resins as the inner cover material produces a substantial increase in the finished balls' overall distance properties. In this regard, the high acid ionomer resin inner covers of balls 1–3 produce an increase of approximately 10 points in C.O.R. over the low acid ionomer resin inner covers of balls 4 and about a 25 point increase over the prior art balls 5. Since an increase in 3 to 6 points in C.O.R. results in an average increase of about 1 yard in distance, such an improvement is deemed to be significant.

Several other outer layer formulations were prepared and tested by molding them around the core and inner cover layer combination to form balls each having a diameter of about 1.68 inches. First, B.F.Goodrich Estane® X4517 polyester polyurethane was molded about the core molded with inner layer cover formulation A. DuPont Surlyn® 9020 was molded about the core which was already molded with inner layer D. Similar properties tests were conducted on these golf balls and the results are set forth in Table 14 below:

TABLE 14

Finish Balls

| Ingredients: | 6 | 7 |
|---|---|---|
| Inner Cover Layer Compostion | A | D |
| Outer Cover Layer Composition | Estane ® 4517 | Surlyn ® 9020 |
| Properties of Molded Finished Balls: | | |
| Compression | 67 | 61 |
| C.O.R. | .774 | .757 |
| Shore C Hardness | 74 | 89 |
| Spin (R.P.M.) | 10,061 | 8,646 |
| Cut Resistance | 3–4 | 1–2 |

The ball comprising inner layer formulation D and Surlyn® 9020 identifies the ball in the Nesbitt 4,431,193 patent. As is noted, the example provides for relatively high softness and spin rate though it suffers from poor cut resistance and low C.O.R. This ball is unacceptable by today's standards.

As for the Estane® X4517 polyester polyurethane, a significant increase in spin rate over the TE-90 cover is noted along with an increased compression. However, the C.O.R. and Shore C values are reduced, while the cut resistance remains the same. Furthermore, both the Estane® X4517 polyester polyurethane and the Surlyn® 9020 were relatively difficult to mold in such thin sections.

EXAMPLE 2

In order to analyze the change in characteristics produced by multi-layer golf balls (standard size) having inner cover layers comprised of ionomer resin blends of different acid levels, a series of experiments were run. Specifically, 14 tests were performed, varying the type of core, inner cover layer and outer cover layer. The results are shown below in Table 15:

TABLE 15

| Sample # | Core | INNER LAYER | THICKNESS | COMP/ COR | OUTER COVER | THICKNESS | COMP (Rhiele) | COR | SHORE D | SPIN |
|---|---|---|---|---|---|---|---|---|---|---|
| 8 | 1042 YELLOW | NONE | — | SEE BELOW | TOP GRADE | 0.055 | 61 | .800 | 68 | 7331 |
| 9 | 1042 YELLOW | NONE | — | SEE BELOW | 959/960 | 0.055" | 56 | .808 | 73 | 6516 |

TABLE 15-continued

| Sample # | Core | INNER LAYER | THICKNESS | COMP/ COR | OUTER COVER | THICKNESS | COMP (Rhiele) | COR | SHORE D | SPIN |
|---|---|---|---|---|---|---|---|---|---|---|
| 10 | SPECIAL 1.47" | 959/960 | 0/050" | 65/.805 | 959/960 | 0.055" | 48 | .830 | 73 | 6258 |
| 11 | 1042 YELLOW | NONE | — | SEE BELOW | SD 90 | 0.055" | 62 | .792 | 63 | 8421 |
| 12 | SPECIAL 1.47" | TOP GRADE | 0.050" | 66/.799 | SD 90 | 0.055" | 55 | .811 | 63 | 8265 |
| 13 | SPECIAL 1.47" | 959/960 | 0.050" | 65/.805 | SD 90 | 0.055" | 53 | .813 | 63 | 8254 |
| 14 | SPECIAL 1.47" | TOP GRADE | 0.050" | 66/.799 | TOP GRADE | 0.055" | 51 | .819 | 68 | 7390 |
| 15 | 1042 YELLOW | NONE | — | SEE BELOW | Z-BALATA | 0.055" | 67 | .782 | 55 | 9479 |
| 16 | SPECIAL 1.47" | 959/960 | 0.050" | 65/.805 | Z-BALATA | 0.055" | 61 | .800 | 55 | 9026 |
| 17 | SPECIAL 1.47" | TOP GRADE | 0.050" | 66/.799 | Z-BALATA | 0.055" | 60 | .798 | 55 | 9262 |

1042 YELLOW > COMP = 72, COR = .780
SPECIAL 1.47" CORE > COMP = 67, COR = .782

In this regard, Top Grade or TG is a low acid inner cover ionomer resin blend comprising of 70.6% Iotek® 8000, 19.9% Iotek® 7010 and 9.6% white masterbatch. "959/960" is a 50/50 wt/wt blend of Iotek® 959/960. In this regard, Escor® or Iotek® 959 is a sodium ion neutralized ethylene-acrylic neutralized ethylene-acrylic acid copolymer. According to Exxon, Iotek® 959 and 960 contain from about 19.0 to about 21.0% by weight acrylic acid with approximately 30 to about 70 percent of the acid groups neutralized with sodium and zinc ions, respectively. The physical properties of these high acid acrylic acid based ionomers are as follows in Table 16:

TABLE 16

| PROPERTY | ESCOR® (IOTEK®) 959 | ESCOR® (IOTEK®) 960 |
|---|---|---|
| Melt Index, g/10 min | 2.0 | 1.8 |
| Cation | Sodium | Zinc |
| Melting Point, °F. | 172 | 174 |
| Vicat Softening Point, °F. | 130 | 131 |
| Tensile @ Break, psi | 4600 | 3500 |
| Elongation @ Break, % | 325 | 430 |
| Hardness, Shore D | 66 | 57 |
| Flexural Modulus, psi | 66,000 | 27,000 |

Furthermore, the low acid ionomer formulation for SD 90 and Z-Balata are set forth below in Table 17:

TABLE 17

| SD Cover | ZB Cover |
|---|---|
| 17.2% Surlyn® 8320 | 19% Iotek® 8000 |
| 7.5% Surlyn® 8120 | 19% Iotek® 7030 |
| 49% Surlyn® 9910 | 52.5% Iotek® 7520 |
| 16.4% Surlyn® 8940 | 9.5% white MB |
| 9.7% white MB | |

The data clearly indicates that higher C.O.R. and hence increased travel distance can be obtained by using multi-layered covered balls versus balls covered with single layers. However, some sacrifices in compression and spin are also noted. Further, as shown in comparing Example Nos. 12 vs. 13, Example Nos. 17 vs. 16, etc., use of lower acid level inner cover layers and relatively soft outer cover layers (i.e., 50 wt. % or more soft ionomer) produces softer compression and higher spin rates than the golf balls comprised of high acid inner cover layers. Consequently, use of blends of low acid ionomer resins to produce the inner layer of a multi-layer covered golf ball produces not only enhanced travel distance but also enhanced compression and spin properties.

EXAMPLE 3

Multi-layer oversized golf balls were produced utilizing different ionomer resin blends as the inner cover layer (i.e., core plus inner cover layer is defined as "mantel"). The "ball data" of the oversized multi-layer golf balls in comparison with production samples of Top-Flite® XL and Top-Flite® Z-Balata is set forth below.

TABLE 18

| | 18 | 19 | 20 | 21 Top-Flite® XL | 22 Top-Flite® Z-Balata 90 |
|---|---|---|---|---|---|
| Core Data | | | | | |
| Size | 1.43 | 1.43 | 1.43 | 1.545 | 1.545 |
| COR | .787 | .787 | .787 | — | — |
| Mantle Data | | | | | |
| Material | TG | TG | TG | — | — |
| Size | 1.61 | 1.61 | 1.61 | — | — |
| Thickness | .090 | .090 | .090 | — | — |
| Shore D | 68 | 68 | 68 | — | — |
| Compression | 57 | 57 | 57 | — | — |
| COR | .815 | .815 | .815 | — | — |
| Ball Data | | | | | |
| Cover | TG | ZB | SD | TG | ZB |
| Size | 1.725 | 1.723 | 1.726 | 1.681 | 1.683 |
| Weight | 45.2 | 45.1 | 45.2 | 45.3 | 45.5 |
| Shore D | 68 | 56 | 63 | 68 | 56 |
| Compression | 45 | 55 | 49 | 53 | 77 |
| COR | .820 | .800 | .810 | .809 | .797 |
| Spin | 7230 | 9268 | 8397 | 7133 | 9287 |

The results indicate that use of multi-layer covers enhances C.O.R. and travel distance. Further, the data shows that use of a blend of low acid ionomer resins (i.e., Top Grade) to form the inner cover layer in combination with a soft outer cover (ZB or SD) produces enhanced spin and compression characteristics. The overall combination results in a relatively optimal golf ball with respect to characteristics of travel distances, spin and durability.

EXAMPLE 4

Castable Polyurethane Covered Multi-layer Balls

A limited number of samples were made using BASF Baytec® RE232 polyurethane as a cover material over four different types of mantle cores. Controls included Z-Balata 100s along with the same mantle cores used for the polyurethane samples covered with Z-Balata cover stock. Mantle cores were made up of 82 and 58 compression cores covered with Iotek® 8030/7030.

Castable PU Molding Process
Materials used:
- Baytec® RE832, mix ratio 9 parts A/12 parts B
- 1—1.57" i.d. smooth cavity
- 2—1.68" i.d. dimpled cavities
- 1—2" hose clamp
- 1—bench vise or large C-clamp (The smooth and dimpled cavities are the same O.D.)

The mantle core is 1.57" and fits snugly in the 1.57" cavity. The hose clamp is attached to the 1.57" cavity and a mantle core is placed inside. Urethane is mixed and poured into one of the dimpled cavities and the two halves are placed together and clamped, forcing out excess material and forming half the cover. The hose clamp is used to keep the two mold halves aligned during curing. When the cover material is set up enough (about 5 minutes), the two halves are separated and the 1.57" mold is replaced with the other 1.68" mold and the process is repeated. Both halves of the cover are now cast and the entire assembly is placed in an 125° F. oven for 1 hour after which it can be opened and the ball removed.

All samples were finished using normal production equipment and procedures. The properties of the finished balls are set forth below in Table 19:

TABLE 19

|  | 23 | 24 | 25 | 26 | 27 | 28 | 29 | 30 |
|---|---|---|---|---|---|---|---|---|
| Core Data |  |  |  |  |  |  |  |  |
| Size | 1.47" | 1.47" | 1.47" | 1.47" | 1.47 | 1.47" | 1.47" | 1.47" |
| Weight | 32.2 | 32 | 32.2 | 32 | 37.7 | 32.2 | 32 | 32.2 |
| Comp | 82 | 58 | 82 | 58 | 85 | 82 | 58 | 82 |
| COR | 768 | 772 | 768 | 772 | 794 | 768 | 772 | 768 |
| Mantle Data | Iotek ® | Iotek ® | Iotek ® | Iotek ® | None | Iotek ® | Iotek ® | Iotek ® |
| Material | 8030/7030 | 8030/7030 | 8030/7030 | 8030/7030 |  | 8030/7030 | 8030/7030 | 8030/7030 |
| Weight | 37.8 | 38.1 | 37.9 | 38.1 |  | 37.8 | 38.1 | 37.9 |
| Size | 1.57" | 1.57" | 1.57" | 1.57" |  | 1.57" | 1.57" | 1.57" |
| Comp | 70 | 48 | 69 | 48 |  | 70 | 48 | 69 |
| COR | 781 | 785 | 786 | 788 |  | 781 | 785 | 786 |
| Ball Data |  |  |  |  |  |  |  |  |
| Cover Material | Baytec ® RE832 | Baytec ® RE832 | Baytec ® RE832 | Baytec ® RE832 | Z-Balata | Z-Balata | Z-Balata | Z-Balata |
| Weight | 45.4 | 45.5 | 45.5 | 45.2 | 45.3 | 44.8 | 45 |  |
| Comp | 75 | 64 | 73 | 60 | 80 | 66 | 50 | 65 |
| COR | 771 | 763 | 770 | 761 | 792 | 775 | 774 | 778 |
| Shore C | 65 | 65 | 65 | 65 | 84 | 84 | 84 | 84 |
| Spin (rpm) | 9560 | 8789 | 9285 | 8760 | 8796 | 8702 | 9072 | 8643 |
| Cut (1-good, 4-poor) | 2 | 2 | 2 | 1.5 | 2 | 2 | 2 | 2 |
| Scuff (1-good, 4-poor) | 1.5 | 1.5 | 1.5 | 1.5 | 2 | 3 | 3 | 3 |

Table 19 contains the construction details and test results. Multilayer balls with the thermoset urethane covers (Examples 23–26) were softer in compression and similar in COR to the multi-layer balls with the Z-Balata cover (Examples 27–30). Shore C was much lower for the urethane balls and they were more resistant to scuff than any of the Z-Balata covered balls. Guillotine cut resistance was about the same. Spin rate comparison shows that the urethane samples are better than the Z-Balata covered balls.

Test results indicate that a very good multi-layer ball can be made using castable polyurethane cover material. Further, advantages include the molding of very thin covers, molding over very soft compression core/mantle, and low cost tooling.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. A golf ball comprising:
   a multi-layer core assembly including (i) a center core component, and (ii) a solid core layer disposed about said center core component; and
   a multi-layer cover assembly including (i) an inner cover layer disposed on said core layer, and (ii) an outer cover layer disposed on said inner cover layer, said outer cover layer defining a plurality of dimples along an outer surface of said outer cover layer,
   wherein at least one of said inner cover layer and said outer cover layer comprise a blend of less than 50% of a high acid ionomer and greater than 50% of a low acid ionomer.

2. The golf ball of claim 1 wherein said blend comprises 10% to 40% of said high acid ionomer and 60% to 90% low acid ionomer.

3. The golf ball of claim 2 wherein said blend comprises 20% to 35% of said high acid ionomer and 65% to 80% low acid ionomer.

4. The golf ball of claim 1 wherein said multi-layer cover assembly has a thickness of from 0.015 inches to about 0.045 inches.

5. The golf ball of claim 4 wherein said multi-layer cover assembly has a thickness of from 0.025 inches to about 0.035 inches.

6. The golf ball of claim 5 wherein said multi-layer cover assembly has a thickness of from about 0.030 inches to about 0.035 inches.

7. The golf ball of claim 1 wherein said outer cover layer has a thickness of from about 0.005 inches to about 0.030 inches.

8. The golf ball of claim 7 wherein said outer cover layer has a thickness of from about 0.010 inches to about 0.020 inches.

9. The golf ball of claim 1 wherein said inner cover layer has a thickness of from about 0.005 inches to about 0.030 inches.

10. The golf ball of claim 9 wherein said inner cover layer has a thickness of from about 0.010 inches to about 0.020 inches.

11. A golf ball comprising:
a multi-layer core assembly including (i) a center core component, and (ii) a solid core layer disposed about said center core component; and
a multi-layer cover assembly including (i) an inner cover layer disposed on said core layer, and (ii) an outer cover layer disposed on said inner cover layer,
wherein at least one of said inner cover layer and said outer cover layer comprises a thermoplastic polyurethane,
wherein at least one of said inner cover layer and said outer cover layer includes an ionomer blend that comprises 10% to 40% of a high acid ionomer and 60% to 90% of a low acid ionomer.

12. The golf ball of claim 11 wherein said blend comprises 20% to 35% of said high acid ionomer and 65% to 80% low acid ionomer.

13. The golf ball of claim 11 wherein said multi-layer cover assembly has a thickness of from 0.015 inches to about 0.045 inches.

14. The golf ball of claim 13 wherein said multi-layer cover assembly has a thickness of from 0.025 inches to about 0.035 inches.

15. The golf ball of claim 14 wherein said multi-layer cover assembly has a thickness of from about 0.030 inches to about 0.035 inches.

16. The golf ball of claim 11 wherein said outer cover layer has a thickness of from about 0.005 inches to about 0.030 inches.

17. The golf ball of claim 16 wherein said outer cover layer has a thickness of from about 0.010 inches to about 0.020 inches.

18. The golf ball of claim 11 wherein said inner cover layer has a thickness of from about 0.005 inches to about 0.030 inches.

19. The golf ball of claim 18 wherein said inner cover layer has a thickness of from about 0.010 inches to about 0.020 inches.

20. The golf ball of claim 11 wherein said polyurethane is a reaction product of an ethylene acrylic or methylene acrylic acid ionomer and an isocyanate prepolymer.

21. The golf ball of claim 20 wherein said ionomer is neutralized with a member selected from the group consisting of magnesium, zinc, lithium, sodium, and combinations thereof.

22. The golf ball of claim 11 wherein said polyurethane is a reaction product of an ethylene acrylic or methylene acrylic acid ionomer, an isocyanate prepolymer, and an acrylate.

23. The golf ball of claim 22 wherein said ionomer is neutralized with a member selected from the group consisting of magnesium, zinc, lithium, sodium, and combinations thereof.

24. A golf ball comprising:
a multi-layer core assembly including (i) a center core component, and (ii) a solid core layer disposed about said center core component; and
a multi-layer cover assembly formed about said multi-layer core assembly, said multi-layer cover assembly comprising (i) an inner cover layer disposed on said core layer, and (ii) an outer cover layer disposed on said inner cover layer,
wherein said multi-layer core assembly exhibits a PGA compression of less than,
wherein at least one of said inner cover layer and said outer cover layer includes an ionomer blend that comprises 10% to 40% of a high acid ionomer and 60% to 90% of a low acid ionomer.

25. The golf ball of claim 24 wherein said multi-layer core assembly exhibits a PGA compression of less than 80.

26. The golf ball of claim 24 wherein said blend comprises 20% to 35% of said high acid ionomer and 65% to 80% low acid ionomer.

27. The golf ball of claim 24 wherein said multi-layer cover assembly has a thickness of from 0.015 inches to about 0.045 inches.

28. The golf ball of claim 27 wherein said multi-layer cover assembly has a thickness of from 0.025 inches to about 0.035 inches.

29. The golf ball of claim 28 wherein said multi-layer cover assembly has a thickness of from about 0.030 inches to about 0.035 inches.

30. The golf ball of claim 24 wherein said outer cover layer has a thickness of from about 0.005 inches to about 0.030 inches.

31. The golf ball of claim 30 wherein said outer cover layer has a thickness of from about 0.010 inches to about 0.020 inches.

32. The golf ball of claim 24 wherein said inner cover layer has a thickness of from about 0.005 inches to about 0.030 inches.

33. The golf ball of claim 32 wherein said inner cover layer has a thickness of from about 0.010 inches to about 0.020 inches.

34. The golf ball of claim 24 wherein said multi-layer cover assembly includes a polyurethane which is a reaction product of an ethylene acrylic or methylene acrylic acid ionomer and an isocyanate prepolymer.

35. The golf ball of claim 34 wherein said ionomer is neutralized with a member selected from the group consisting-of magnesium, zinc, lithium, sodium, and combinations thereof.

36. The golf ball of claim 24 wherein said multi-layer cover assembly includes a polyurethane which is a reaction product of an ethylene acrylic or methylene acrylic acid ionomer, an isocyanate prepolymer, and an acrylate.

37. The golf ball of claim 36 wherein said ionomer is neutralized with a member selected from the group consisting of magnesium, zinc, lithium, sodium, and combinations thereof.

* * * * *